(12) United States Patent
Ouchi et al.

(10) Patent No.: US 9,709,015 B2
(45) Date of Patent: Jul. 18, 2017

(54) POWER GENERATION UNIT, AND MOTOR GENERATOR CONTROL METHOD

(71) Applicant: HONDA MOTOR CO., LTD., Tokyo (JP)

(72) Inventors: Katsuhiro Ouchi, Wako (JP); Takeshi Yanagisawa, Wako (JP); Yutaka Sonoda, Wako (JP); Tatsuya Shiozawa, Wako (JP); Atsushi Katayama, Wako (JP); Hitoshi Kurosaka, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/777,650

(22) PCT Filed: Dec. 11, 2013

(86) PCT No.: PCT/JP2013/083254
§ 371 (c)(1),
(2) Date: Sep. 16, 2015

(87) PCT Pub. No.: WO2014/147904
PCT Pub. Date: Sep. 25, 2014

(65) Prior Publication Data
US 2016/0102644 A1    Apr. 14, 2016

(30) Foreign Application Priority Data
Mar. 21, 2013    (JP) .................................. 2013-058438

(51) Int. Cl.
*F02N 11/08*    (2006.01)
*F02N 11/04*    (2006.01)
(Continued)

(52) U.S. Cl.
CPC ............ *F02N 11/0814* (2013.01); *B60K 6/26* (2013.01); *B60K 6/485* (2013.01); *F02B 61/02* (2013.01);
(Continued)

(58) Field of Classification Search
CPC ................................... H02K 3/00; H02P 9/00
(Continued)

(56) References Cited

U.S. PATENT DOCUMENTS 3,902,073 A * 8/1975 Lafuze .................... F02N 11/04
                                                                    290/38 R
6,034,511 A    3/2000 Scott et al.
(Continued)

FOREIGN PATENT DOCUMENTS

CN    1275254    11/2000
CN    1745513    3/2006
(Continued)

OTHER PUBLICATIONS

International Search Report, Date of Mailing Mar. 4, 2014 (Mar. 4, 2014).
(Continued)

*Primary Examiner* — Tulsidas C Patel
*Assistant Examiner* — Charles Reid, Jr.
(74) *Attorney, Agent, or Firm* — Rankin, Hill & Clark LLP

(57) ABSTRACT

A power generation unit includes a motor generator having a rotor with magnet, and a stator with coils driven in a plurality of phases, the coils of the respective phases not being connected to each other; and a driving control part that performs control so that a coil of each phase of the stator is brought into any one of a first state in which torque is generated by the rotor, a second state in which both ends of
(Continued)

the coil are electrically released, and a third state in which both ends of the coil are short-circuited.

12 Claims, 17 Drawing Sheets

(51) Int. Cl.

| | | |
|---|---|---|
| *B60K 6/485* | (2007.10) |
| *B60K 6/26* | (2007.10) |
| *H02J 7/16* | (2006.01) |
| *H02J 7/14* | (2006.01) |
| *H02P 9/48* | (2006.01) |
| *H02P 27/08* | (2006.01) |
| *F02B 63/04* | (2006.01) |
| *F02B 61/02* | (2006.01) |
| *H02K 21/22* | (2006.01) |
| *F02D 29/06* | (2006.01) |

(52) U.S. Cl.
CPC .............. *F02B 63/04* (2013.01); *F02N 11/04* (2013.01); *F02N 11/0859* (2013.01); *H02J 7/1484* (2013.01); *H02J 7/16* (2013.01); *H02K 21/22* (2013.01); *H02P 9/48* (2013.01); *H02P 27/085* (2013.01); *B60K 2006/264* (2013.01); *B60L 2220/14* (2013.01); *B60L 2220/56* (2013.01); *F02D 29/06* (2013.01); *F02N 2200/062* (2013.01); *F02N 2200/063* (2013.01); *F02N 2200/101* (2013.01); *Y02T 10/6226* (2013.01)

(58) Field of Classification Search
USPC .......................................................... 290/31
See application file for complete search history.

(56) References Cited

U.S. PATENT DOCUMENTS

| | | | |
|---|---|---|---|
| 7,064,526 B2 * | 6/2006 | Patterson ................ F02N 11/04 290/1 C |
| 2004/0145266 A1 * | 7/2004 | Gladkov .............. H02K 21/225 310/180 |
| 2005/0045392 A1 * | 3/2005 | Maslov .................... B60L 8/00 180/65.51 |
| 2005/0237034 A1 | 10/2005 | Patterson |
| 2005/0258790 A1 | 11/2005 | Takeuchi |
| 2011/0101930 A1 | 5/2011 | Itoi et al. |
| 2011/0291600 A1 | 12/2011 | Takeuchi |

FOREIGN PATENT DOCUMENTS

| | | | |
|---|---|---|---|
| CN | 101060255 | | 10/2007 |
| EP | 1 562 277 A1 | | 8/2005 |
| EP | 1 562 277 A1 | | 10/2005 |
| EP | 2 280 477 A1 | | 2/2011 |
| GB | 11299 | | 0/1904 |
| JP | 06294369 A | * | 10/1994 |
| JP | 07-095789 | | 4/1995 |
| JP | 07115704 A | * | 5/1995 |
| JP | 2001-211693 | | 8/2001 |
| JP | 4410680 | | 11/2009 |
| JP | 2010-226926 | | 10/2010 |
| JP | 2011-025872 | | 2/2011 |
| JP | 2011-97739 | | 5/2011 |
| JP | 2011-250557 | | 12/2011 |
| JP | 2013166499 A | * | 8/2013 |

OTHER PUBLICATIONS

European Search Report dated Nov. 18, 2016, 12 pages.
Chinese Office Action dated Dec. 16, 2016 (partial English translation of Search Report included).

* cited by examiner

| | 0-60° | 60-120° | 120-180° | 180-240° | 240-300° | 300-360° |
|---|---|---|---|---|---|---|
| UTr1 | ON | ON | ON | OFF | OFF | OFF |
| UTr2 | OFF | OFF | OFF | ON | ON | ON |
| UTr3 | OFF | OFF | OFF | ON | ON | ON |
| UTr4 | ON | ON | ON | OFF | OFF | OFF |
| UTr5 | ON | ON | ON | ON | ON | ON |
| VTr1 | OFF | OFF | ON | ON | ON | OFF |
| VTr2 | ON | ON | OFF | OFF | OFF | ON |
| VTr3 | ON | ON | OFF | OFF | OFF | ON |
| VTr4 | OFF | OFF | ON | ON | ON | OFF |
| VTr5 | ON | ON | ON | ON | ON | ON |
| WTr1 | ON | OFF | OFF | OFF | ON | ON |
| WTr2 | OFF | ON | ON | ON | OFF | OFF |
| WTr3 | OFF | ON | ON | ON | OFF | OFF |
| WTr4 | ON | OFF | OFF | OFF | ON | ON |
| WTr5 | ON | ON | ON | ON | ON | ON |

FIG. 11

| | 0–60° | 60–120° | 120–180° | 180–240° | 240–300° | 300–360° |
|---|---|---|---|---|---|---|
| UTr1 | | | | | | |
| UTr2 | \multicolumn{6}{OPERATE AS PHASE REGULATOR} | | | | | |
| UTr3 | (PHASE OF ENERGIZATION PATTERN HAVING MAGNETIC POLE POSITION | | | | | |
| UTr4 | AS BASIS VARIES ACCORDING TO VOLTAGE) | | | | | |
| UTr5 | | | | | | |
| VTr1 | OFF | OFF | OFF | OFF | OFF | OFF |
| VTr2 | OFF | OFF | OFF | OFF | OFF | OFF |
| VTr3 | OFF | OFF | OFF | OFF | OFF | OFF |
| VTr4 | OFF | OFF | OFF | OFF | OFF | OFF |
| VTr5 | OFF | OFF | OFF | OFF | OFF | OFF |
| WTr1 | OFF | OFF | OFF | OFF | OFF | OFF |
| WTr2 | OFF | OFF | OFF | OFF | OFF | OFF |
| WTr3 | OFF | OFF | OFF | OFF | OFF | OFF |
| WTr4 | OFF | OFF | OFF | OFF | OFF | OFF |
| WTr5 | OFF | OFF | OFF | OFF | OFF | OFF |

HALL IC DETECTED WAVEFORM (N/S)

FIG. 12

|  | 0–60° | 60–120° | 120–180° | 180–240° | 240–300° | 300–360° |
|---|---|---|---|---|---|---|
| UTr1 | | | | | | |
| UTr2 | \multicolumn{6}{OPERATE AS PHASE REGULATOR} | | | | | |
| UTr3 | (PHASE OF ENERGIZATION PATTERN HAVING MAGNETIC POLE POSITION | | | | | |
| UTr4 | AS BASIS VARIES ACCORDING TO VOLTAGE) | | | | | |
| UTr5 | | | | | | |
| VTr1 | OFF | OFF | OFF | OFF | OFF | OFF |
| VTr2 | ON | ON | ON | ON | ON | ON |
| VTr3 | OFF | OFF | OFF | OFF | OFF | OFF |
| VTr4 | ON | ON | ON | ON | ON | ON |
| VTr5 | OFF | OFF | OFF | OFF | OFF | OFF |
| WTr1 | OFF | OFF | OFF | OFF | OFF | OFF |
| WTr2 | ON | ON | ON | ON | ON | ON |
| WTr3 | OFF | OFF | OFF | OFF | OFF | OFF |
| WTr4 | ON | ON | ON | ON | ON | ON |
| WTr5 | OFF | OFF | OFF | OFF | OFF | OFF |

HALL IC DETECTED WAVEFORM (N/S)

POWER GENERATION UNIT, AND MOTOR GENERATOR CONTROL METHOD

TECHNICAL FIELD

The present invention relates to a power generation unit and a motor generator control method.

Priority is claimed on Japanese Patent Application No. 2013-058438, filed Mar. 21, 2013, the contents of which are incorporated herein by reference.

BACKGROUND ART

In the related art, motors (three-phase motors) that are driven in three phases have been widely used. In general three-phase motors, coils of respective phases are connected to each other at neutral positions thereof, and electric currents are not independently applied to the coils of the respective phases.

In contrast, an invention of an electric power steering apparatus equipped with a motor having a connection relationship in which coils of respective phases can be independently driven is disclosed (for example, refer to Patent Document 1). If the coils of the respective phases can be independently driven, a larger torque can be output as compared to the case where the coils of the respective phases are connected to each other.

On the other hand, the applicability of motors has also increased. For example, an invention of a motor generator that functions as a starter motor at the time of starting an engine and functions as a generator after the engine is started is disclosed (refer to Patent Document 2). The motor generator of such an aspect may be referred to as an alternating current generator (ACG) starter. By using the ACG starter, the need for including a related-art cell motor type starter disappears. For this reason, weight and costs can be reduced, and generation of noise caused by a reduction gear that couples a cell motor type starter and a crankshaft together can be eliminated. Particularly, in vehicles that perform idling stop, which have recently become more common, the ACG starter is preferably used because mechanical noise at the time of the starting of the engine is suppressed.

PRIOR ART DOCUMENTS

Patent Documents

Patent Document 1: Japanese Unexamined Patent Application, First Publication No. 2011-25872
Patent Document 2: Japanese Patent No. 4410680

SUMMARY OF INVENTION

Problems to be Solved by the Invention

The ACG starter is coupled to the crankshaft without being coupled via the reduction gear. Therefore, a method by which to obtain enough torque act on the crankshaft to overcome compression occurring on a top dead center of the engine at the time of starting the engine is an issue.

As in the motor described in Patent Document 1, it is considered to use the motor capable of independently driving the coils of the respective phases as the ACG starter. However, if electric power generation is performed by connecting the motor capable of independently driving the coils of the respective phases to the engine, output is high when functioning as a starter motor, whereas the amount of power generation may become excessively large when functioning as a generator. As a result, friction may become large, and the acceleration ability of a vehicle may degrade. In this way, in the motors in the related art, the state of friction is determined by required torque output performance.

Aspects of the invention have been made in consideration of such circumstances, and an object thereof is to provide a power generation unit and a motor generator control method capable of improving torque output performance while suppressing an increase in friction.

Means for Solving the Problems (1) A power generation unit related to the invention includes a motor generator having a rotor with magnet, and a stator with coils driven in a plurality of phases, the coils of each phase not being connected to each other; and a driving control part that performs control so that a coil of each phase of the stator is brought into any one of a first state in which torque is generated by the rotor, a second state in which both ends of the coil are electrically released, and a third state in which both ends of the coil are short-circuited.

Here, the expression "a first state in which torque is generated by the rotor" includes both a state (powering) in which torque is output in a rotation direction of the rotor, and a state (regeneration) in which an induced current accompanying the rotation of the rotor is taken out.

(2) In the above aspect (1), the rotor may be connected to a rotation output shaft of an internal combustion engine that outputs a driving force for traveling, and the driving control part may bring some coils among of the plurality of phases into the second state or the third state when the motor generator is made to generate electric power using the output of the internal combustion engine.

(3) In the above aspect (2), the driving control part may bring some coils among of the plurality of phases into the second state when a number of rotations of the rotor is lower than a predetermined number of rotations, and may bring some coils among of the plurality of phases into the third state when a number of rotations of the rotor is equal to or greater than a predetermined number of rotations.

(4) In the above aspect (2) or (3), the driving control part may bring all the coils of the plurality of phases into the first state when the internal combustion engine is started by applying torque to the rotation output shaft.

(5) In any of the above aspects (1) to (4), the driving control part may have a bridge circuit in which a plurality of switching elements sandwich the coils therebetween. In the second state, all of the plurality of switching elements of the bridge circuit may be brought into an OFF state. In the third state, a switching element on a negative electrode side of a battery connected to the power generation unit among the plurality of switching elements of the bridge circuit may be brought into an ON state, and a switching element on a positive electrode side thereof may be brought into an OFF state.

(6) In any of the above aspects (1) to (5), the coils of the plurality of phases may have different numbers of turns and may generate electric power at mutually different power generation voltages.

(7) In any of the above aspects (1) to (6), the driving control part may make switching timings for the switching elements of each phase different from each other, thereby making the coils of the plurality of phases generate electric power at mutually different power generation voltages.

(8) In any of the above aspects (6) to (7), electric power generated by some coils among of the plurality of phases may be used for charging a vehicle-mounted battery, and electric power generated by some other coils of the plurality of phases may be used for driving a lighting device (HL).

(9) In any of the above aspects (1) to (8), the rotor may be connected to a rotation output shaft of an internal combustion engine that outputs a driving force for traveling. When a charge state of a vehicle-mounted battery is equal to or greater than a predetermined level, the driving control part may make some coils among of the plurality of phases generate electric power using the rotary power of the internal combustion engine, may charge the vehicle-mounted battery with the generated electric power, and may bring some other coils among of the plurality of phases into the second state or the third state. When a charge state of the vehicle-mounted battery is lower than a predetermined level, the driving control part may make the coils of phases, which has more phases than the phases of the some coils when the charge state of the vehicle-mounted battery is equal to or greater than a predetermined level, generate electric power using rotary power of the internal combustion engine.

(10) In any of the above aspects (1) to (8), the rotor may be connected to a rotation output shaft of an internal combustion engine that outputs a driving force for traveling. When an acceleration instruction is given to the vehicle and when a charge state of a vehicle-mounted battery is equal to or greater than a predetermined level, the driving control part may bring all the coils of the plurality of phases into the second state or the third state. When an acceleration instruction is given to the vehicle and when a charge state of a vehicle-mounted battery is lower than a predetermined level, the driving control part may make some coils among of the plurality of phases generate electric power using rotary power of the internal combustion engine, may charge the vehicle-mounted battery with the generated electric power, and may bring some other coils among of the plurality of phases into the second state or the third state.

(11) In any of the above aspects (1) to (10), the rotor may be connected to a rotation output shaft of an internal combustion engine that outputs a driving force for traveling. The driving control part may perform powering control of the motor generator while making at least some coils among of the plurality of phases in the first state until a number of rotations of the internal combustion engine becomes equal to or greater than a predetermined number of rotations after an acceleration instruction is given to the vehicle in a stopped state or in a state in which the vehicle travels at low speed.

(12) In any of the above aspects (1) to (11), the stator may have coils driven in three phases. When electric power is generated using rotary power of a driving source, the driving control part may bring a coil of one phase among the coils driven in the three phases into the first state and may bring coils of the two remaining phases into the second state or the third state.

(13) A motor generator control method related of the invention is a method for controlling a motor generator having a rotor with magnet, and a stator with coils driven in a plurality of phases, the coils of each phase not being connected to each other. When a number of rotations of the rotor is in a low rotation range, some coils among of the plurality of phases are brought into a state in which both ends of a coil are electrically released, and when a number of rotations of the rotor is in a high rotation range, some coils among of the plurality of phases are brought into a state in which both ends of a coil are short-circuited.

Advantageous Effects of Invention

According to the above aspects (1) and (2), the stator in which the coils of the each phase are not connected to each other is included and control is performed so that the coil of each phase is brought into any one of a plurality of states including the first state in which torque is generated by the rotor, the second state in which both ends of the coil are electrically released, and the third state in which both ends of the coil are short-circuited. Therefore, torque output performance can be improved while suppressing an increase in friction.

According to the above aspects (3) and (13), when the number of rotations of the rotor is in the low rotation range, coils of some phases are brought into the second state in which both ends of the coil are electrically released, and when the number of rotations is in the high rotation range, the coils of some phases are brought into the third state in which both ends of the coil are short-circuited. Therefore, the friction can be further reduced.

According to the above aspect (4), the internal combustion engine is started when all the coils of the plurality of phases are brought into the first state. Therefore, torque for overcoming compression on the top dead center of the internal combustion engine can be output.

According to the above aspect (9), when the charge state of the vehicle-mounted battery is lower than the predetermined level, the coils of phases, which has more phases than the coils of phases when the charge state of the vehicle-mounted battery is equal to or greater than the predetermined level, is made to generate electric power using the rotary power of the internal combustion engine. Therefore, the vehicle-mounted battery can be rapidly charged.

According to the above aspect (10), when an acceleration instruction is given to the vehicle and when the charge state of the vehicle-mounted battery is equal to or greater than the predetermined level, all the coils of the plurality of phases are brought into the second state or the third state. Therefore, the friction can be further reduced and the acceleration ability of the motorcycle 1 can be improved.

According to the above aspect (11), powering control of the motor generator is performed while making at least some coils among of the plurality of phases in the first state until the number of rotations of the internal combustion engine becomes equal to or greater than the predetermined number of rotations after an acceleration instruction is given to the vehicle in the stopped state or in the state in which the vehicle travels at low speed. Therefore, the acceleration ability at the time of starting moving in the vehicle can be improved.

BRIEF DESCRIPTION OF DRAWINGS

FIG. 11 is a view illustrating an example of the state changes of the respective switching elements when V-phase and W-phase coils are brought into an open state.

FIG. 12 is a view illustrating an example of the state changes of the respective switching elements when the V-phase coil and the W-phase coil are brought into a short-circuited state.

DESCRIPTION OF EMBODIMENTS

Hereinafter, embodiments of a power generation unit and a motor generator control method of the invention will be described with reference to the drawings.

First Embodiment

Overall Configuration of Motorcycle

Figure 1:
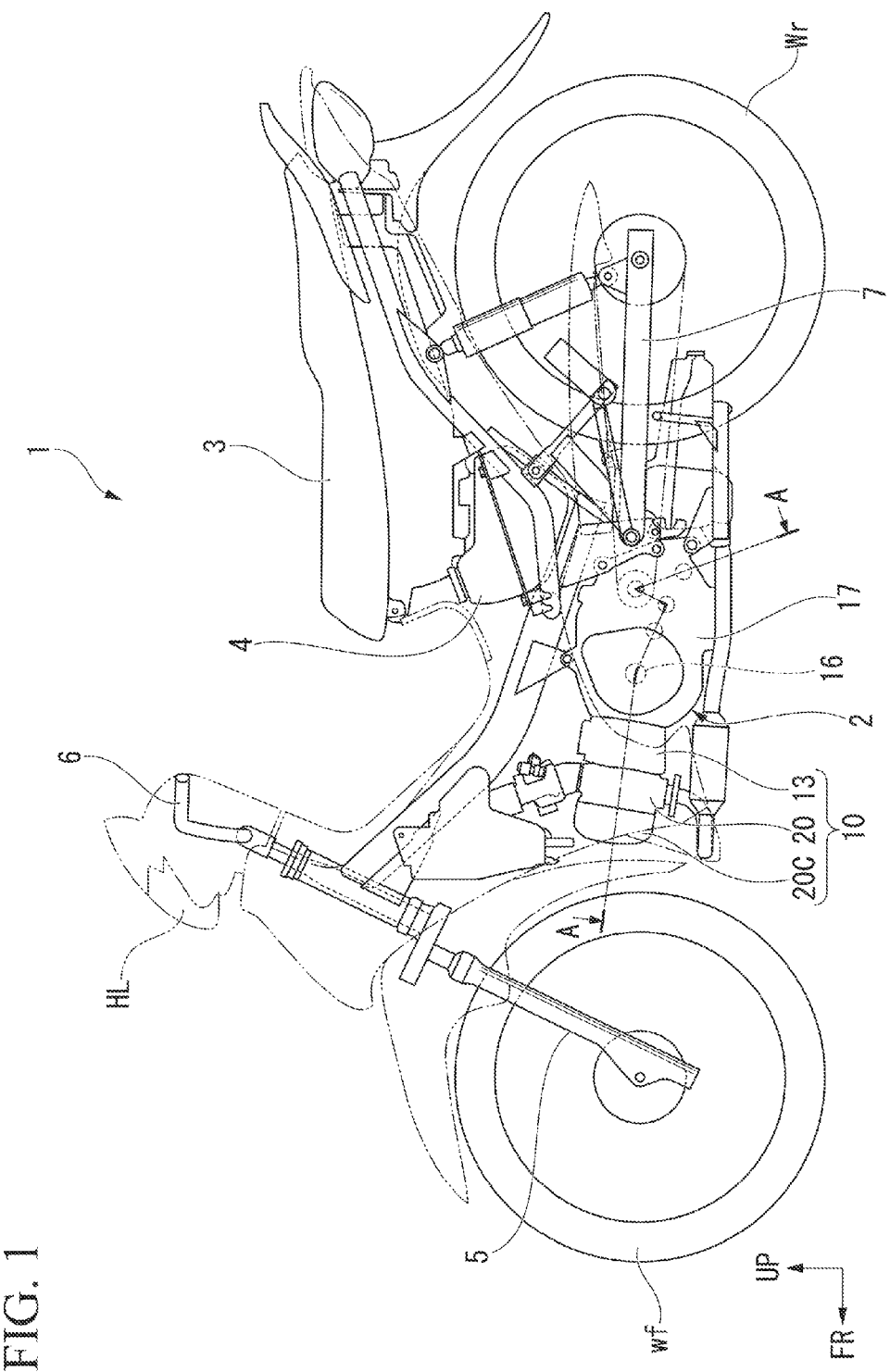
FIG. 1 is a configuration view illustrating an example of an overall configuration of a motorcycle on which an ACG starter (motor generator) related to each of embodiments of the invention is mounted.

FIG. 1 is a configuration view illustrating an example of an overall configuration of a motorcycle 1 on which an ACG starter (motor generator) 60 related to each of the embodiments of the invention is mounted. In the motorcycle 1, an engine unit 2 is mounted at the center in a vehicle body front-rear direction, a seat 3 on which an occupant sits down is provided above a rear portion of the engine unit 2, and a fuel tank 4 is provided below the seat 3. A head lamp (lighting device) HL is provided at the front of the motorcycle 1.

A front wheel Wf is rotatably supported by a front fork 5. A steering handle 6 is provided at an upper portion of the front fork 5. A brake lever (not illustrated) and a throttle grip (not illustrated) are arranged on the right side of the steering handle 6. Additionally, a rear wheel Wr is swingably supported by a vehicle body frame via a swing arm 7.

Figure 2:
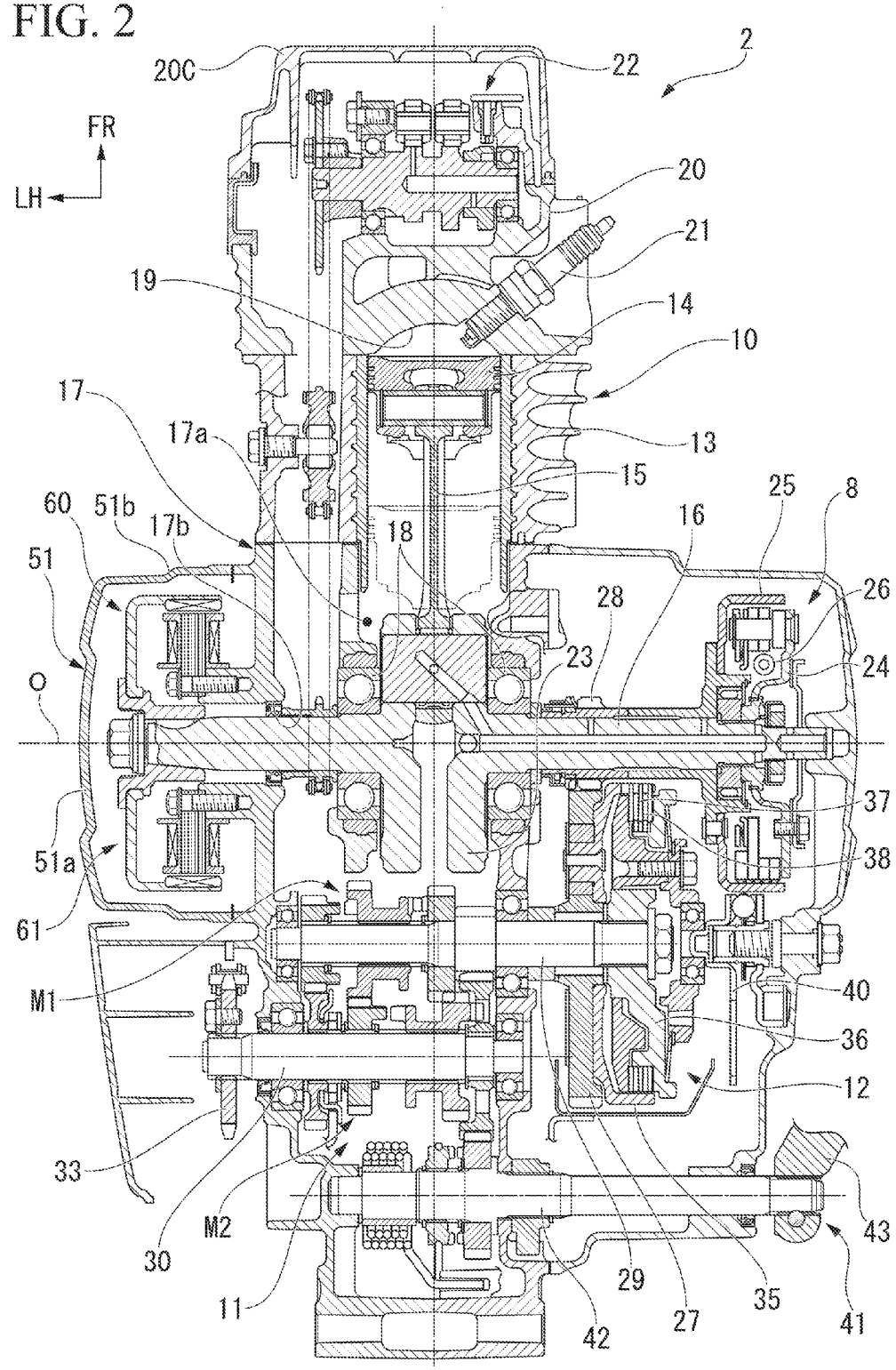
FIG. 2 is a developed cross-sectional view of an engine unit corresponding to an A-A cross-section of FIG. 1.

FIG. 2 is a developed cross-sectional view of the engine unit 2 corresponding to an A-A cross-section of FIG. 1. In the engine unit 2, a reciprocal engine 10 that is an internal combustion engine that outputs a driving force for traveling, and a multistage transmission 11 are constituted as an integral block. The engine 10 and the transmission 11 are configured so that power can be transmitted via a centrifugal clutch 8 and a transmission clutch 12.

In the engine 10, a piston 14 is slidably fitted into a cylinder bore of a cylinder block 13. The piston 14 is coupled to a crankshaft (rotation output shaft) 16 via a connecting rod 15. The engine 10, as illustrated in FIG. 1, is mounted on a vehicle in a substantially horizontal posture in which the cylinder block 13 extends to the front of the vehicle body with respect to the crankshaft 16.

The crankshaft 16 is rotatably supported via a bearing 18 to a crankcase 17 which is combined with a base end portion of the cylinder block 13. Additionally, a cylinder head 20 that forms a combustion chamber 19 between the cylinder head and the piston 14 is attached to a tip portion of the cylinder block 13.

In addition, reference sign 21 in FIG. 2 represents an ignition device that is installed in the cylinder head 20 so as to face the inside of the combustion chamber 19. Additionally, reference sign 22 represents a valve gear that is provided on a tip side of the cylinder head 20 to drive the opening and closing of an intake/exhaust valve (not illustrated) while interlocking with the crankshaft 16 and is covered with a head cover 20C. Additionally, reference sign 23 of FIG. 2 represents crank webs provided on both sides in an axial direction of a coupling portion (crankpin) with the connecting rod 15 on the crankshaft 16. Additionally, reference sign 17a represents a crank chamber within a crankcase 17 that houses substantially the entire region of the crankshaft 16.

The centrifugal clutch 8 is provided at the outer periphery (the outer periphery closer to the outer side in the axial direction than the crank webs 23) of one end portion (an end portion on the right side of a paper surface of FIG. 2, hereinafter referred to as a right end portion) of the crankshaft 16 in the axial direction. The centrifugal clutch 8 is equipped with an inner clutch 24 that is integrally fixed to the right end portion of the crankshaft 16, an outer clutch 25 that is rotatably supported by the outer periphery of the right end portion of the crankshaft 16, and a centrifugal weight 26 that rotates integrally with the inner clutch 24 and brings the inner clutch 24 and the outer clutch 25 into a connected state due to a centrifugal force. The centrifugal clutch 8 outputs the rotational power of the crankshaft 16 to the outer clutch 25 when the rotating speed of the crankshaft 16 reaches a predetermined speed or higher.

Additionally, an output gear 28, which meshes with an input gear 27 integrated with the transmission clutch 12, is integrally rotatably combined with the outer clutch 25. A main shaft 29 and a counter shaft 30 of the transmission 11 are provided parallel to the crankshaft 16 at positions closer to the vehicle rear side than a rotation center O of the crankshaft 16 within the crankcase 17.

The main shaft 29 and the counter shaft 30 are rotatably supported within the crankcase 17 via a pair of bearings, which are arranged apart from each other, respectively. Additionally, the main shaft 29 is arranged at a position adjacent to the vehicle rear side of the crankshaft 16, and the counter shaft 30 is arranged at a position adjacent to the vehicle rear side of the main shaft 29.

A main shift gear group M1 is disposed on the main shaft 29 of the transmission 11. A counter gear group M2 that meshes with a main gear group M1 is disposed on the counter shaft 30. The input gear 27 meshing with the output gear 28 on the crankshaft 16 side and the transmission clutch 12 are provided at one end portion (an end portion on the right side of the paper surface of FIG. 2, hereinafter referred to as a right end portion) of the main shaft 29 in the axial direction.

The input gear 27 is rotatably supported on the outer periphery of the main shaft 29. Additionally, an output sprocket 33 is attached to the other end portion (an end portion on the left side of the paper surface of FIG. 2) of the counter shaft 30 in the axial direction. A chain for power transmission (not illustrated) is hung around on the output sprocket 33, and the rotation of the counter shaft 30 is transmitted to the rear wheel Wr that is a driving wheel via the chain.

In the transmission 11, a driving transmission gear of the main gear group M1 and the counter gear group M2 is selected by rotational operation of a shift drum (not illustrated) provided within the crankcase 17, and thereby, an arbitrary shift gear stage (gear position) that includes neutral is set.

The transmission clutch 12 is equipped with an outer clutch 35, the inner clutch 36, a plurality of driving friction plates 37, a plurality of driven friction plates 38, a clutch spring (not illustrated), and an operating plate 40. The outer clutch 35 has a bottomed cylindrical shape that is rotatably supported on the main shaft 29 in a state in which the outer clutch is combined integrally with the input gear 27. The inner clutch 36 has a substantially disc-like shape that is spline-fitted to the main shaft 29. The plurality of driving friction plates 37 are integrally rotatably locked to the outer clutch 35. The plurality of the driven friction plates 38 are integrally rotatably locked to the inner clutch 36 and come into frictional contact with the driving friction plates 37. The clutch spring biases the driving friction plates 37 and the driven friction plates 38 in a pressure contact direction. The operation panel 40 operates to release the biasing force of the clutch spring that acts between the driving friction plates 37 and the driven friction plates 38.

The driving friction plates 37 on the outer clutch 35 side and the driven friction plates 38 on the inner clutch 36 side are arranged alternately in the axial direction, and are pressed against each other under the biasing force of the clutch spring. Accordingly, the power transmission between the outer clutch 35 and the inner clutch 36 becomes possible. Additionally, by operating to release the biasing force of the clutch spring using the operating plate 40, the power transmission between the inner clutch 36 the outer clutch 35 is cut off.

In the present embodiment, the operating plate 40 is configured so as to be movable back and forth in the axial direction while interlocking with the operation of a shift pedal (not illustrated). When the shift pedal is operated, the operating plate 40 releases the biasing force of the clutch spring that acts between the driving friction plates 37 and the driven friction plates 38 for a predetermined period before a shift gear meshes therewith, and thereby stops the power transmission between the outer clutch 35 and the inner clutch 36. After the meshing of the shift gear, a state in which the driving friction plates 37 and the driven friction plates 38 mesh with each other is brought about.

Additionally, a kick spindle 42 of a kick starter 41 is rotatably attached to a lower side of a rear portion of the crankcase 17. The kick spindle 42 transmits its rotation to the crankshaft 16 only when the kick pedal 43 is stepped on.

Meanwhile, the other end portion (an end portion on the left side of the paper surface of FIG. 2, hereinafter referred to as a left end portion) of the crankshaft 16 in the axial direction passes through a circular opening 17b formed in a side wall (wall portion) of the crankcase 17 and protrudes to the outside from the side wall of the crankcase 17. An ACG starter 60, which also serves as an AC generator and a starting motor of the engine 10, is attached to a left end portion side of the crankshaft 16 protruding from the opening 17b of the crankcase 17. Additionally, the left end portion of the crankshaft 16 is covered with a concave engine cover 51 attached to the side wall of the crankcase 17 by being fastened with a bolt or the like.

The engine cover 51 is equipped with a bottom wall portion 51a and a side wall portion 51b (cover portion). The bottom wall portion 51a covers the left end portion of the crankshaft 16 from the left side. The side wall portion 51b extends so as to rise from an outer peripheral edge of the bottom wall portion 51a, abuts against the side wall of the crankcase 17 at the tip thereof, and is combined with the crankcase 17.

Power Generation Unit

Figure 3:
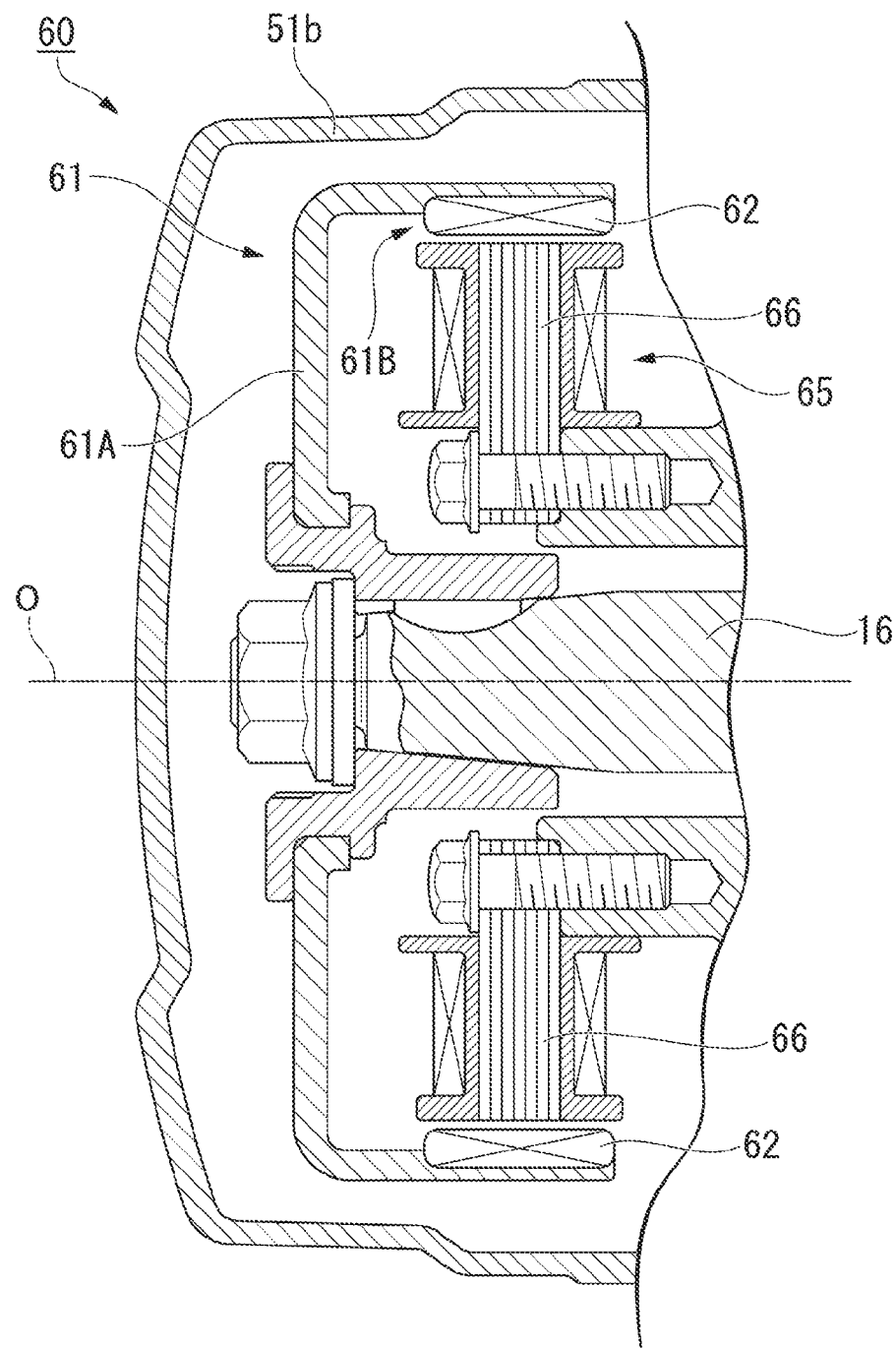
FIG. 3 illustrates an example of a cross-sectional view of an ACG starter related to a first embodiment.

FIG. 3 illustrates an example of a cross-sectional view of the ACG starter 60 related to the first embodiment. The ACG starter 60 is equipped with a rotor 61 that rotates integrally with the crankshaft 16, and a stator 65. The rotor 61 has magnets.

The rotor 61 has a substantially cylindrical shape, a bottom wall portion 61A forms a disk surface, and an opening is formed on a side opposite to the bottom wall portion 61A and introduces the crankshaft 16 therethrough. Magnets 62 are attached to or formed on an inner circumferential face 61B of a side wall portion of the rotor 61.

A first stator 65, for example, is coupled to the crankcase 17 and is housed inside the rotor 61 in its radial direction. The first stator 65 is equipped with a plurality of external-teeth-shaped stator cores 66 that protrude in the direction of the rotor 61 and around which coils are wound. The stator cores 66 make magnetic flux, which is generated by applying an electric current to the coils, and act on the magnets 62, thereby generating torque in the rotor 61.

Additionally, the first stator 65 takes out an induced current generated by the rotation of the rotor 61 accompanying the traveling of the motorcycle 1, and generates electric power. The electric power generated from the first stator 65 is stored in a battery 80 (to be described below). The first stator 65 has a structure in which the stator cores 66 have, for example, eighteen poles, and a U pole, a V pole, and W pole are sequentially arranged one by one. In contrast, a total of twelve magnets 62, for example, are provided such that a magnet in which a side facing a stator core 66 is an S pole and a magnet in which a side facing a stator core 66 is an N pole are alternately arranged.

Figure 4:
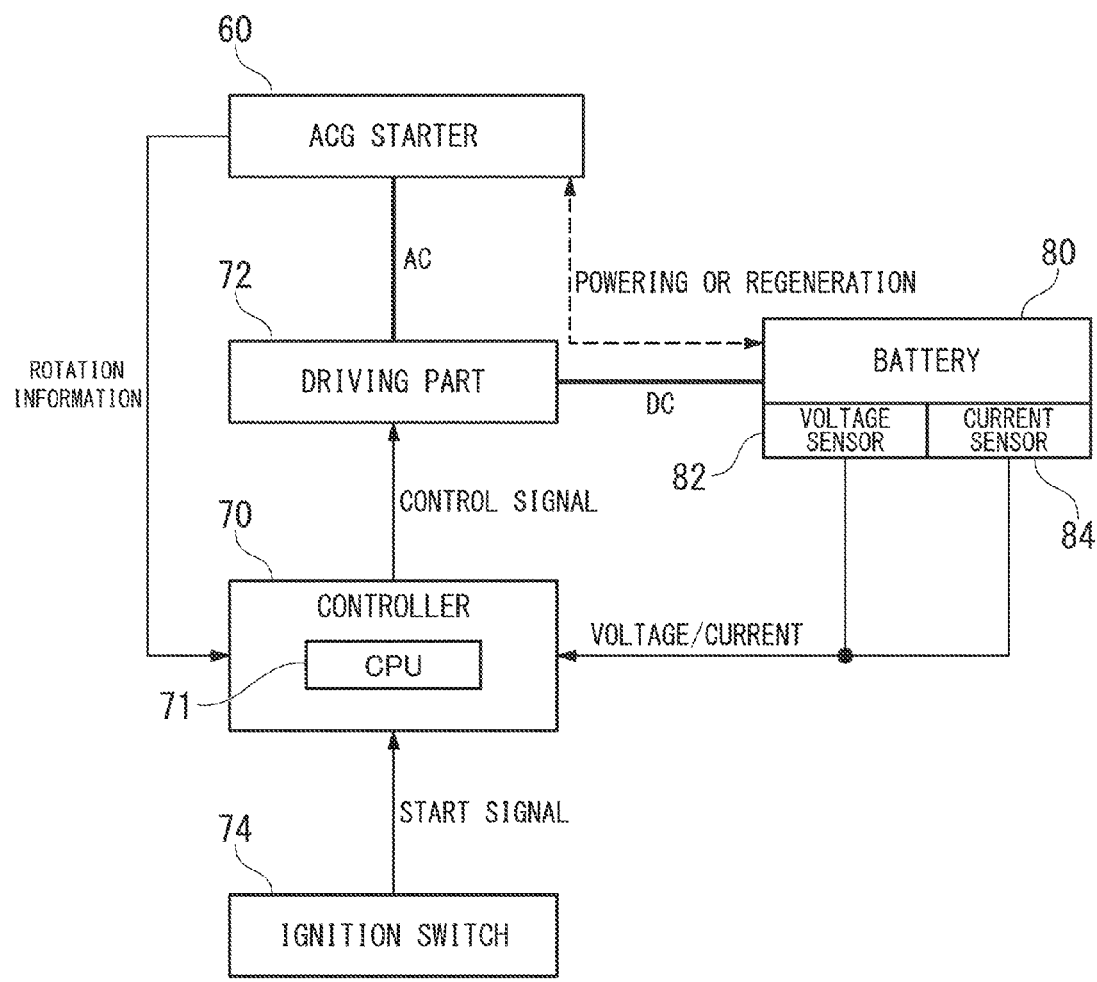
FIG. 4 is a view illustrating an example of a control-related configuration of the ACG starter.

FIG. 4 is a view illustrating an example of a control-related configuration of the ACG starter 60. The ACG starter 60 is controlled by a controller 70 (driving control part) and a driving part 72 (driving control part). The controller 70 is, for example, a microcomputer centered on a central processing unit (CPU) 71. The controller 70 acquires rotation information from a Hall IC (not illustrated) of the ACG starter 60. In addition, instead of the rotation information of the ACG starter 60, the rotational angle information of the crankshaft 16, or the like may be acquired from a crank angle sensor or a control device of the engine 10. The controller 70 calculates the number of rotations N of the rotor 61 on the basis of the rotation information of the ACG starter 60.

The driving part 72 is equipped with, for example, a plurality of switching elements (to be described below) for controlling the ACG starter 60 in three phases which are a U phase, a V phase, and a W phase. The plurality of switching elements have bridge circuits that sandwiches the coils therebetween. The controller 70 drives (powers) the ACG starter 60, for example, according to a start signal input from an ignition switch 74, and outputs torque for starting the engine 10 to the ACG starter 60. This start signal may be input from the control device of the engine 10. In addition, the powering control of the ACG starter 60 may be performed for outputting an assistance torque at the time of starting moving in the motorcycle 1.

Additionally, after the engine 10 is started, the ACG starter 60 is made to generate (regenerate) electric power using the output of the engine 10 according to the charge state of the battery 80, and charges the battery 80. The controller 70 generates a control signal sent to switching element groups (UTr1 to UTr5, VTr1 to VTr5, and WTr1 to WTr5; will be described below) for performing this phase regulation control, and outputs the control signal to the driving part 72.

Information on the voltage between terminals of the battery 80 or the amounts of charge and discharge currents is input to the controller 70 from a voltage sensor 82 or a current sensor 84 attached to the battery 80. The controller 70 estimates the charge state (charging rate) of the battery 80 on the basis of the voltage between the terminals of the battery 80, or calculates the charge state (charging rate) of the battery 80 by integrating the amounts of charge and discharge currents. The battery 80 supplies electric power for driving the ACG starter 60 or electric power for allowing other electrical components (for example, a head lamp or the like) to operate.

Wiring Structure and Powering Control

Figure 5:
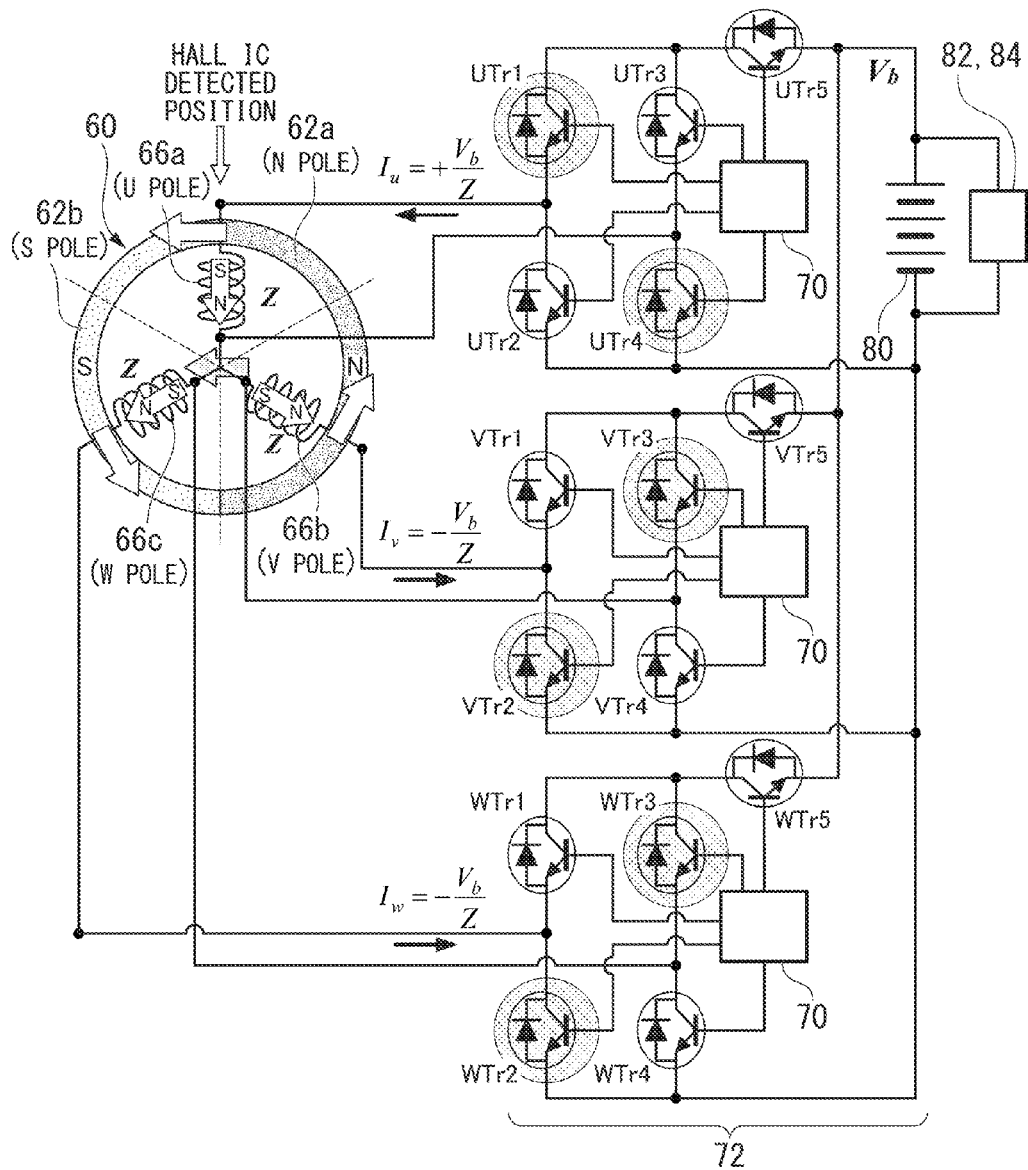
FIG. 5 is a view illustrating the relationship between wound coils in the ACG starter and a driving part.

FIG. 5 is a view illustrating the relationship between wound coils in the ACG starter 60 and the driving part 72.

In the wound coils in the ACG starter 60, three-phase coils constituted by a U pole 66a, a V pole 66b, and a W pole 66c are not connected to each other, and energization in the respective phases is controlled by the U-phase switching elements (UTr1 to UTr5), the V-phase switching elements (VTr1 to VTr5), and the W-phase switching elements (WTr1 to WTr5). According to such a structure, a larger torque can be output as compared to a case where the coils of the respective phases are connected to each other. There is no specific limit on the types of the switching elements, and arbitrary types of switching elements may be used. In FIG. 5, the magnet 62 includes an N pole 62a in which a side facing a stator core 66 is an N pole, and an S pole 62b in which a side facing a stator core 66 is an S pole.

Figure 6:
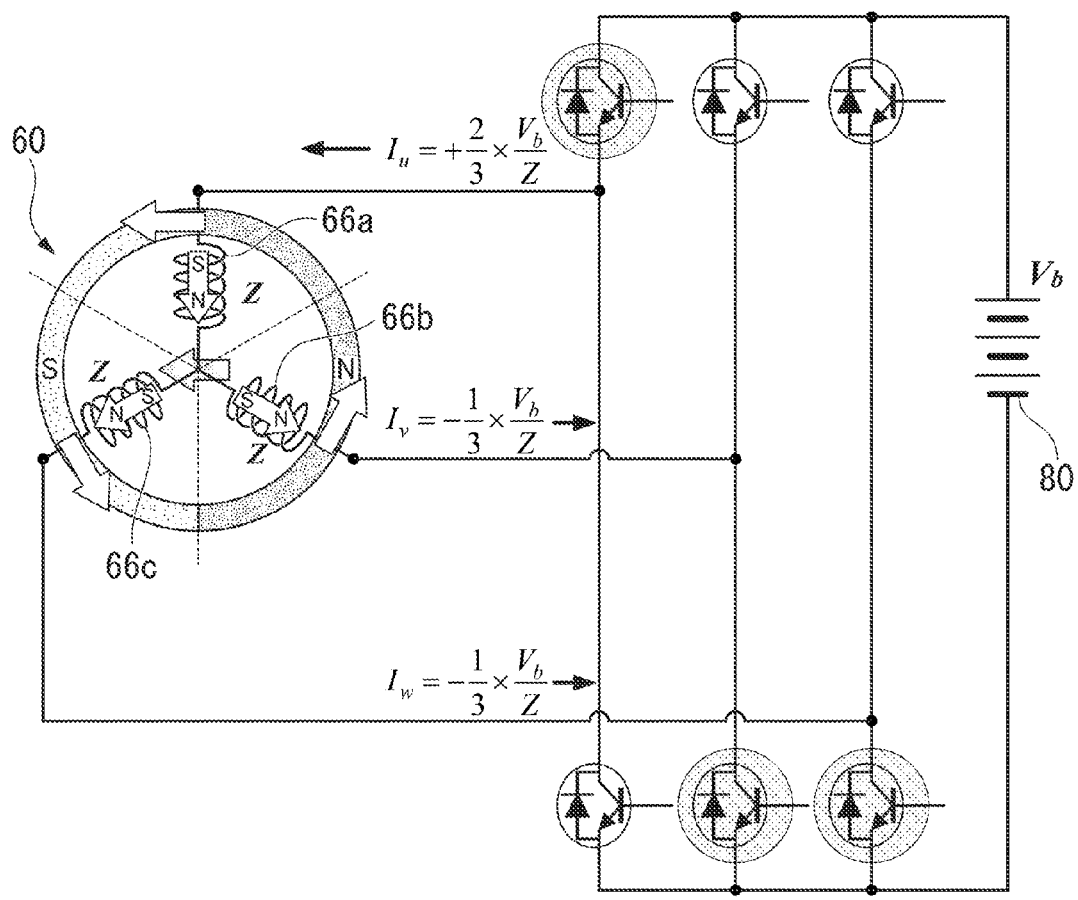
FIG. 6 is a view illustrating a driving structure of a general motor in which three-phase coils are connected to each other.

FIG. 6 is a view illustrating a driving structure of a general motor in which three-phase coils are connected to each other. In the motor illustrated in FIG. 6, if driving is performed through 180-degree energization with respect to three-phase Y connection, a current Iq that contributes torque is the total of components which directly travels in the direction of magnetic flux of the rotor 61. Therefore, if the impedance of each phase is defined as Z and the voltage of the battery is defined as Vb, the following Expression (1) is established. In the motor illustrated in FIG. 6, torque Tq proportional to the current Iq can be output.

Expression 1

$$I_q = I_u \times \cos 0° + I_v \times \cos 120° + I_w \times \cos 240° \qquad (1)$$
$$= +\frac{2}{3} \times \frac{V_b}{Z} \times 1 - \frac{1}{3} \times \frac{V_b}{Z} \times \left(-\frac{1}{2}\right) - \frac{1}{3} \times \frac{V_b}{Z} \times \left(-\frac{1}{2}\right)$$
$$= \frac{V_b}{Z}$$

In contrast, the following Expression (2) is established in the power generation unit (60, 70, and 72) of the present embodiment.

Expression 2

$$I_q = I_u \times \cos 0° + I_v \times \cos 120° + I_w \times \cos 240° \qquad (2)$$
$$= +\frac{V_b}{Z} \times 1 - \frac{V_b}{Z} \times \left(-\frac{1}{2}\right) - \frac{V_b}{Z} \times \left(-\frac{1}{2}\right)$$
$$= 2 \times \frac{V_b}{Z}$$

Figures 7, 8:
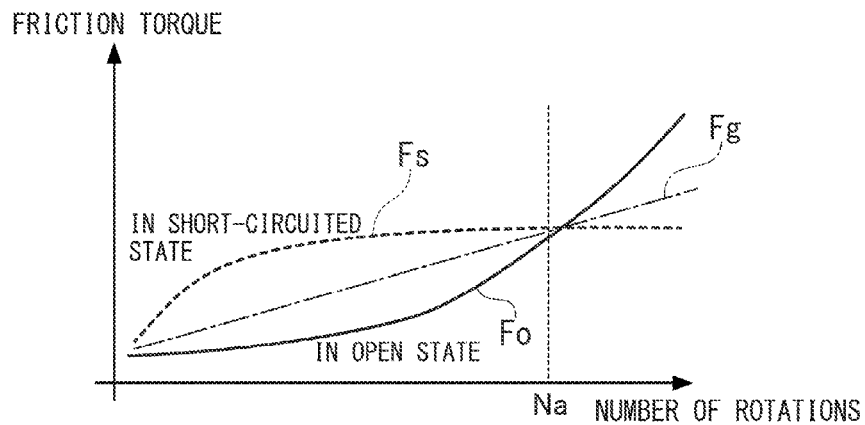
FIG. 7 is a view illustrating an example of the state changes of respective switching elements when a power generation unit performs powering control.
FIG. 8 is a view illustrating properties of friction torque according to the number of rotations of a rotor.

Accordingly, torque Tq twice as large as the torque of the motor of the type illustrated in FIG. 6 can be output. As a result, even when a motor is miniaturized, torque required to overcome compression occurring on the top dead center can be output when the engine 10 is started. FIG. 7 is a view illustrating an example of the state changes of respective switching elements when the power generation unit performs the powering control.

Regenerative Control

On the other hand, when the ACG starter 60 is made to generate electric power using the output of the engine 10 after the engine 10 is started, the controller 70 brings the V phase and the W phase into a state in which power generation is not performed, for example, when only the U phase is used for power generation and when electric power of a degree such that the battery 80 mounted on the motorcycle 1 is charged and various electrical components are driven can be taken out. Accordingly, friction can be reduced as compared to a case where all of the three phases are used for power generation.

By virtue of the wiring structure illustrated in FIG. 5, the power generation unit can select either a state (open state) in which both ends of a coil are released or a state (short-circuited state) in which both the ends of the coil are short-circuited, as "the state in which power generation is not performed". Even when power generation is not performed, a certain degree of friction torque is generated, but this friction torque has properties such that it changes according to the number of rotations of the rotor 61.

FIG. 8 is a view illustrating properties of the friction torque according to the number of rotations of the rotor 61. As illustrated in FIG. 8, it is known that, in a low rotation range where the number of rotations N of the rotor 61 is lower than an ideal threshold Na, a friction torque Fs when the short-circuited state is brought about becomes larger than a friction torque Fo when the open state is brought about, and in a high rotation range where the number of rotations N of the rotor 61 is equal to or greater than the ideal threshold Na, the friction torque Fs where the short-circuited state is brought about becomes lower than the friction torque Fo in the case where the open state is brought about.

In addition, in the drawing, Fo represents a friction torque in a state in which generated electric power is taken out. Additionally, the ideal threshold Na is an adaptation value that is determined on the basis of the size of the ACG motor 60, the number of times the coils are wound, the number of poles, or the like.

For this reason, the controller 70 of the present embodiment brings the V-phase and W-phase coils into the open state when the number of rotations N of the rotor 61 is in the low rotation range, and brings the V-phase and W-phase coils into the short-circuited state when the number of rotations N of the rotor 61 is in the high rotation range. Accordingly, the friction can be further reduced as compared to a case where either the open state or the short-circuited state is maintained in the entire rotation range.

Figure 9:
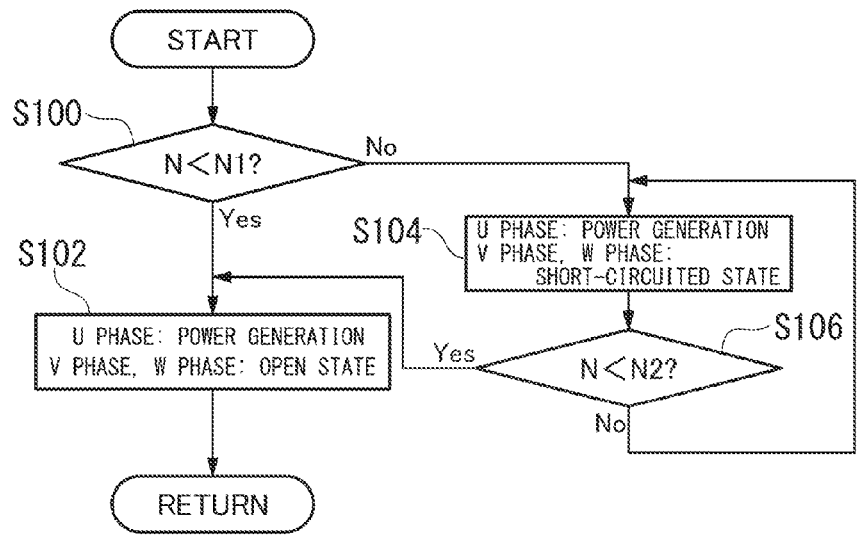
FIG. 9 illustrates an example of a flowchart illustrating a flow of processing executed by a controller of the first embodiment.

FIG. 9 illustrates an example of a flowchart illustrating a flow of processing executed by the controller 70 of the first embodiment. The processing of the flowchart of FIG. 9 is repeatedly executed until the engine 10 stops after being started.

First, the controller 70 determines whether or not the number of rotations N of the rotor 61 is lower than a first threshold N1 (predetermined number of rotations) (Step S100). When the number of rotations N of the rotor 61 is lower than the first threshold N1, the controller 70 makes the U-phase coil operate as a phase regulator to take out generated electric power and bring the V-phase and W-phase coils into the open state (Step S102), and ends one routine in the processing of the flowchart of FIG. 9.

When the number of rotations N of the rotor 61 is equal to or greater than the first threshold N1, the controller 70 makes the U-phase coil operate as a phase regulator and brings the V-phase and W-phase coils into the short-circuited state (Step S104). Then, the controller 70 maintains the V-phase and W-phase coils in the short-circuited state until the number of rotations N of the rotor 61 becomes lower than the second threshold N2 (Step S106). Here, for example, a relationship of N1>N2 is established between the first threshold N1 and the second threshold N2.

Additionally, the threshold N1 and the threshold N2 are values near the aforementioned ideal threshold Na. Accordingly, hunting in which switching between states is frequently performed can be prevented from occurring, and fluctuations of the friction can be suppressed.

On the other hand, if the number of rotations N of the rotor 61 becomes lower than the second threshold N2, the controller 70 makes the U-phase coil operate as a phase regulator and brings the V-phase and W-phase coils into the open state (Step S102), and ends one routine in the processing of the flowchart of FIG. 9.

Figure 10:
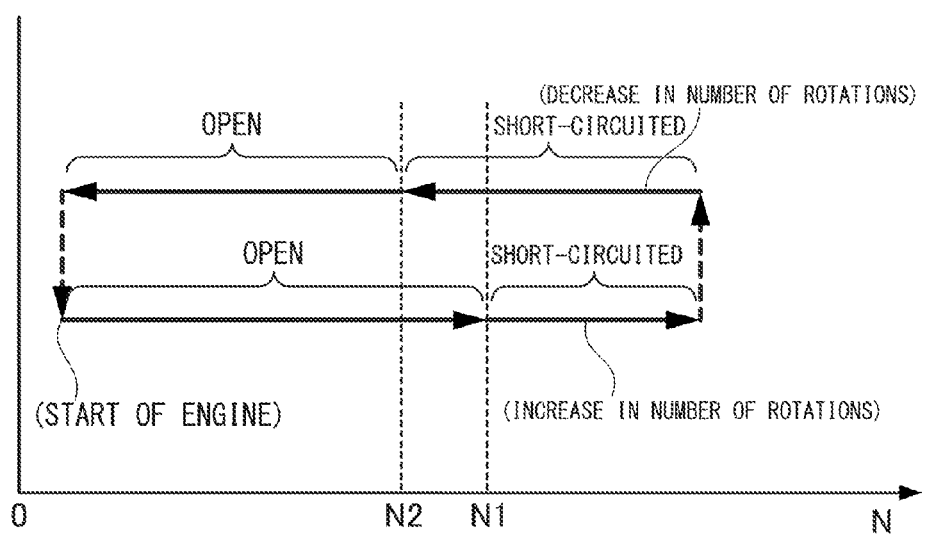
FIG. 10 is a view illustrating the state transition of a V phase and a W phase.

FIG. 10 is a view illustrating the state transition of the V phase and the W phase realized through the above control. The number of rotations N of the rotor 61 is near zero at the time of the starting of the engine 10, and the V-phase and W-phase coils are brought into the open state. If the number of rotations N of the rotor 61 increases from here and becomes equal to or greater than the threshold N1, the V-phase and W-phase coils are brought into the short-circuited state. Thereafter, if the number of rotations N of the rotor 61 decreases and becomes lower than the threshold N2 which is lower than the threshold N1, the V-phase and W-phase coils are brought into the open state.

When the threshold at the time of the increase and the threshold at the time of the decrease are the same (N1=N2) and the number of rotations N of the rotor 61 goes up and down near the threshold, switching is frequently performed between the states of the V-phase and W-phase coils, and fluctuations of the friction occur frequently. In the power generation unit of the present embodiment, such hunting can be suppressed from occurring by performing the above-described control.

FIG. 11 is a view illustrating an example of the state changes of the respective switching elements when the V-phase and W-phase coils are brought into the open state. As illustrated in FIG. 11, in the U phase electric power operates as a phase regulator. That is, the phase of an energization pattern having a magnetic pole position as a basis thereof varies according to a voltage. On the other hand, in the V phase and the W phase in which power generation is not performed, all the switching elements (VTr1 to VTr5 and WTr1 to WTr5) are maintained in an OFF state.

FIG. 12 is a view illustrating an example of the state changes of the respective switching elements when the V-phase and W-phase coils are brought into the short-circuited state. As illustrated in FIG. 12, the U phase in which power generation is performed is controlled to operate as a phase regulator. On the other hand, in the V phase and the W phase in which power generation is not performed, only the switching elements VTr2, VTr4, WTr2, and WTr4 are brought into an ON state, and both ends of the coil in each phase are maintained in the short-circuited state. That is, in the V phase and the W phase in which power generation is not performed, the switching elements on the negative electrode side of the battery connected to (the power generation unit) the switching element are brought into the ON state, and the switching elements on the positive electrode side thereof are brought into the OFF state. In addition, here, only the switching elements VTr1, VTr3, WTr1, and WTr3 may be brought into the ON state.

Conclusion

According to the power generation unit and the motor generator control method of the present embodiment described above, in the ACG starter 60, the three-phase coils are not connected to each other, and energization in the respective phases is controlled by the exclusive switching element groups. Therefore, a larger torque can be output as compared to a case where the coils of the respective phases are connected to each other. Additionally, when the ACG starter 60 is made to generate electric power, the controller 70, for example, uses only the U phase for power generation and brings the V phase and the W phase into a state in which power generation is not performed. Therefore, the friction can be reduced as compared to a case where all of the three phases are used for power generation. As a result, torque output performance can be improved by suppressing an increase in friction while avoiding enlargement of the ACG starter 60.

Additionally, the power generation unit of the present embodiment can select either the state (open state) in which both ends of a coil are released or a state (short-circuited state) in which both the ends of the coil are short-circuited, as "the state in which power generation is not performed". Also, the controller 70 of the present embodiment brings the V-phase and W-phase coils into the open state when the number of rotations N of the rotor 61 is in the low rotation range, and brings the V-phase and W-phase coils into the short-circuited state when the number of rotations N of the rotor 61 is in the high rotation range. Therefore, the friction can be further reduced as compared to a case where either the open state or the short-circuited state is maintained in the entire rotation range.

Second Embodiment

Hereinafter, a power generation unit and a motor generator control method related to a second embodiment of the invention will be described. Since the overall configuration of the motorcycle and the structure and the powering control of the power generation unit are the same as those of the first embodiment, FIGS. 1 to 7 will be referred to and repeated description thereof will be omitted.

Figure 13:
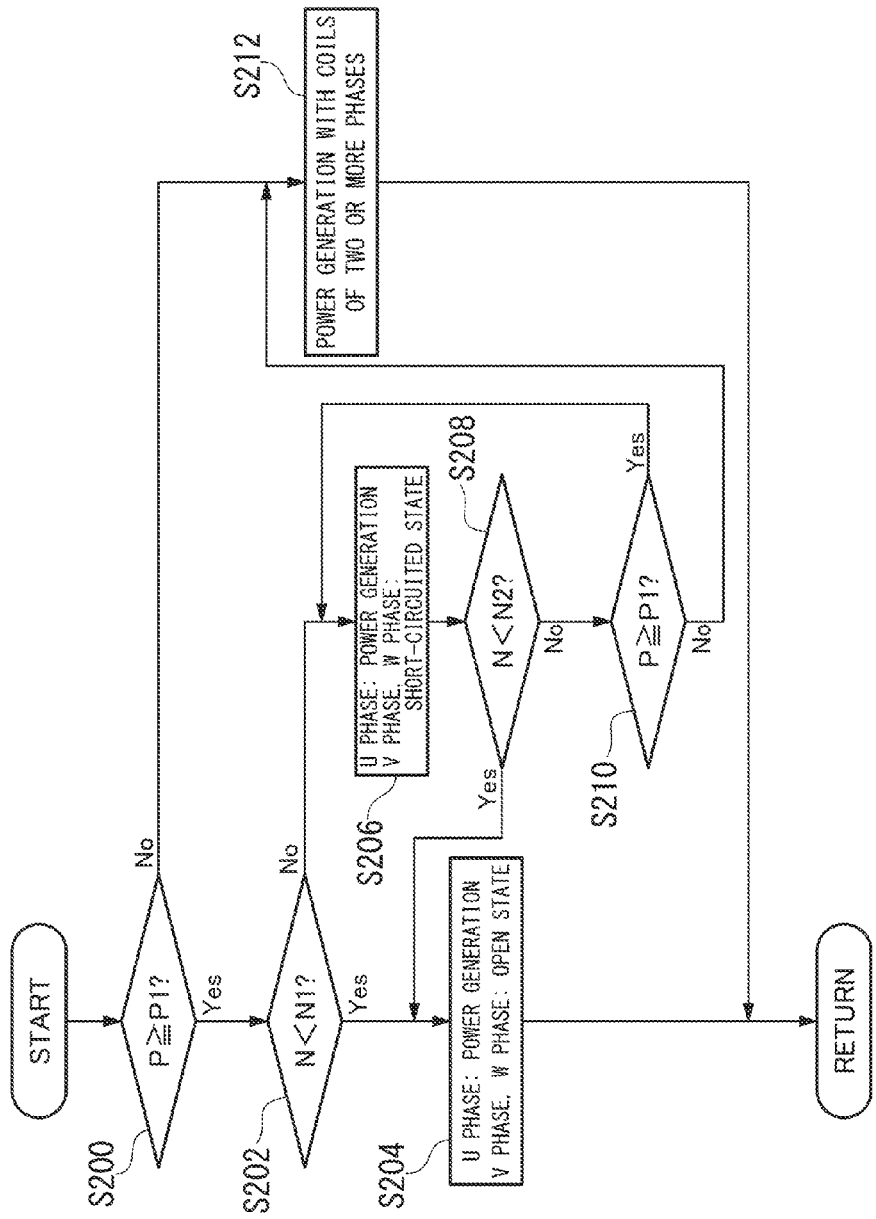
FIG. 13 illustrates an example of a flowchart illustrating a flow of processing executed by a controller of a second embodiment.

The controller 70 related to the second embodiment estimates or calculates the charging rate of the battery 80 on the basis of information on a voltage or a current input from the battery 80, and dynamically changes control at the time of the regenerative control on the basis of the charging rate of the battery 80. FIG. 13 illustrates an example of a flowchart illustrating a flow of processing executed by the controller 70 of the second embodiment. The processing of the flowchart of FIG. 13 is repeatedly executed until the engine 10 stops after being started.

First, the controller 70 determines whether or not a charging rate P representing the charge state of the battery 80 is equal to or greater than a threshold (predetermined level) P1 (for example, about 50[%]) (Step S200). Here, the charging rate P of the battery 80 and the voltage between the terminals of the battery 80 has a certain degree of correlation. Therefore, the determination in Step S200 may be performed by comparing the voltage between the terminals of the battery 80 with a threshold. The same applies below.

When the charging rate P of the battery 80 is equal to or greater than the threshold P1 in Step S200, the controller 70 determines whether or not the number of rotations N of the rotor 61 is lower than the first threshold N1 (Step S202). When the number of rotations N of the rotor 61 is lower than the first threshold N1 in Step S202, the controller 70 makes the U-phase coil operate as a phase regulator and brings the V-phase and W-phase coils into the open state (Step S204), and ends one routine in the processing of the flowchart of FIG. 13.

On the other hand, when the number of rotations N of the rotor 61 is equal to or greater than the first threshold N1 in Step S202, the controller 70 makes the U-phase coil operate as a phase regulator and brings the V-phase and W-phase coils into the short-circuited state (Step S206). Then, the controller 70 maintains the V-phase and W-phase coils in the short-circuited state until the number of rotations N of the rotor 61 becomes lower than the second threshold N2 (Step S208). However, if the charging rate P of the battery 80 becomes lower than the threshold P1, the controller 70 proceeds to Step S212 (Step S210).

For example, a relationship of N1>N2 is established between the first threshold N1 and the second threshold N2. Additionally, the threshold N1 and the threshold N2 are values near the aforementioned ideal threshold Na. Accordingly, hunting in which switching between states is frequently performed can be prevented from occurring, and fluctuations of the friction can be suppressed.

On the other hand, if the number of rotations N of the rotor 61 becomes lower than the second threshold N2 in Step S208, the controller 70 makes the U-phase coil operate as a phase regulator and brings the V-phase and W-phase coils into the open state (Step S204), and ends one routine in the processing of the flowchart of FIG. 13.

Next, when the charging rate P of the battery 80 is lower than the threshold P1 in Step S210, the controller 70 makes coils of two or more phases operate as phase regulators, and generates electric power (Step S212). Here, the controller 70 may make coils of two phases among U phase, V phase, and W phase operate as phase regulators, or may make coils of all the phases operate as phase regulators. In the former case, in a coil of a phase that is not made to operate as a phase regulator, switching may be performed between the open state and the short-circuited state according to the number of rotations of the rotor 61 similar to Steps S202 to S208.

That is, when the charge state of the vehicle-mounted battery 80 is equal to or greater than a predetermined level, the controller 70 (driving control part) makes some coils among of a plurality of phases generate electric power using the rotary power of the engine 10 (internal combustion engine), charges the battery 80 with this generated electric power, and brings some other coils among of the plurality of phases into the open state or the short-circuited state, and when the charge state of the battery 80 is lower than a predetermined level, the controller makes the coils of phases, which has more phases than the phases of the some other coils when the charge state of a battery 80 is equal to or greater than the predetermined level, generate electric power using the rotary power of the engine 10 (internal combustion engine).

By virtue of such control, the power generation unit related to the second embodiment can flexibly increase the amount of power generation of the ACG starter 60, when the charging rate of the battery 80 is low and can rapidly charge the battery 80. As a result, a possibility that battery exhaustion occurs in the battery 80 can be reduced.

According to the power generation unit and the motor generator control method related to the second embodiment described above, the same effects as those of the first embodiment can be exhibited. Also, when the charging rate of the battery 80 is low, the amount of power generation can be flexibly increased, and the battery 80 can be rapidly charged.

Third Embodiment

Hereinafter, a power generation unit and a motor generator control method related to a second embodiment of the invention will be described. Since the overall configuration of the motorcycle and the structure and the powering control of the power generation unit are the same as those of the first embodiment, FIGS. 1 to 3 and 5 to 7 will be referred to and repeated description thereof will be omitted.

Figure 14:
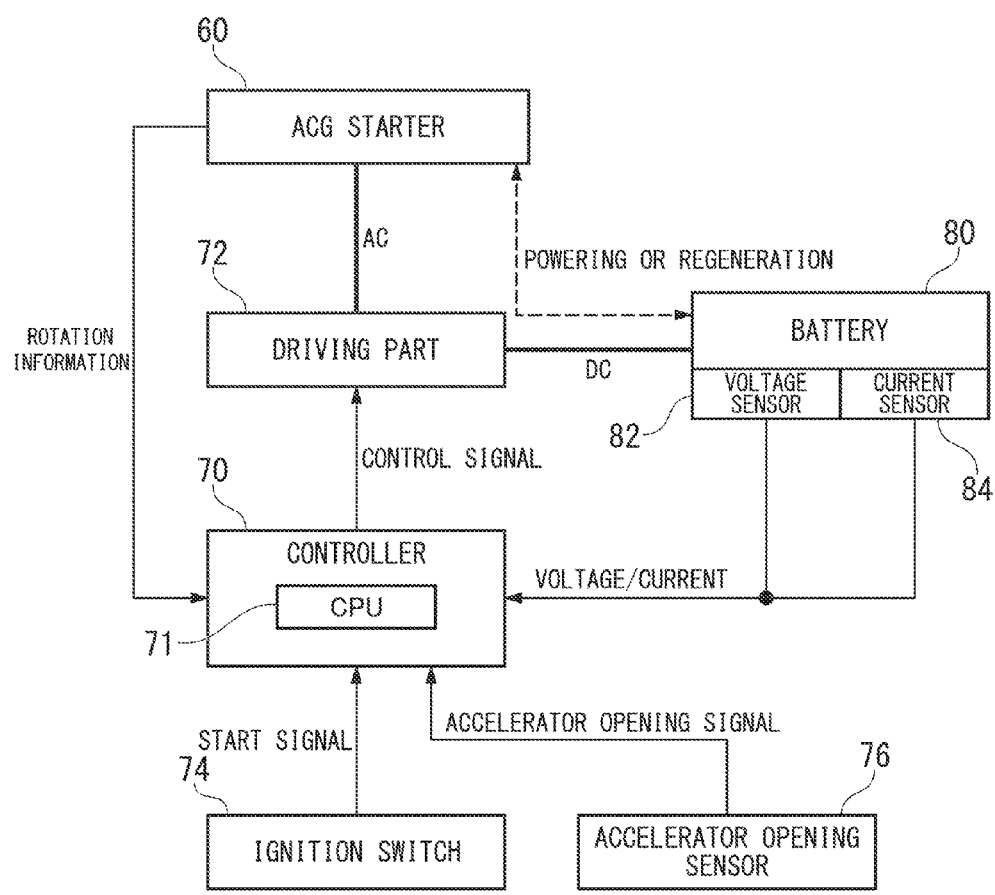
FIG. 14 is a view illustrating an example of a control-related configuration of an ACG starter of a third embodiment.

FIG. 14 is a view illustrating an example of a control-related configuration of the ACG starter 60 of the third embodiment. In the third embodiment, an accelerator opening signal representing an accelerator opening degree AC is input from an accelerator opening sensor 76 to the controller 70. The accelerator opening sensor 76, for example, detects the amount of rotation of a rotary shaft, which extends from a throttle grip to which an acceleration instruction is input by a driver and which is rotated by a throttle wire, as the accelerator opening degree AC.

Figure 15:
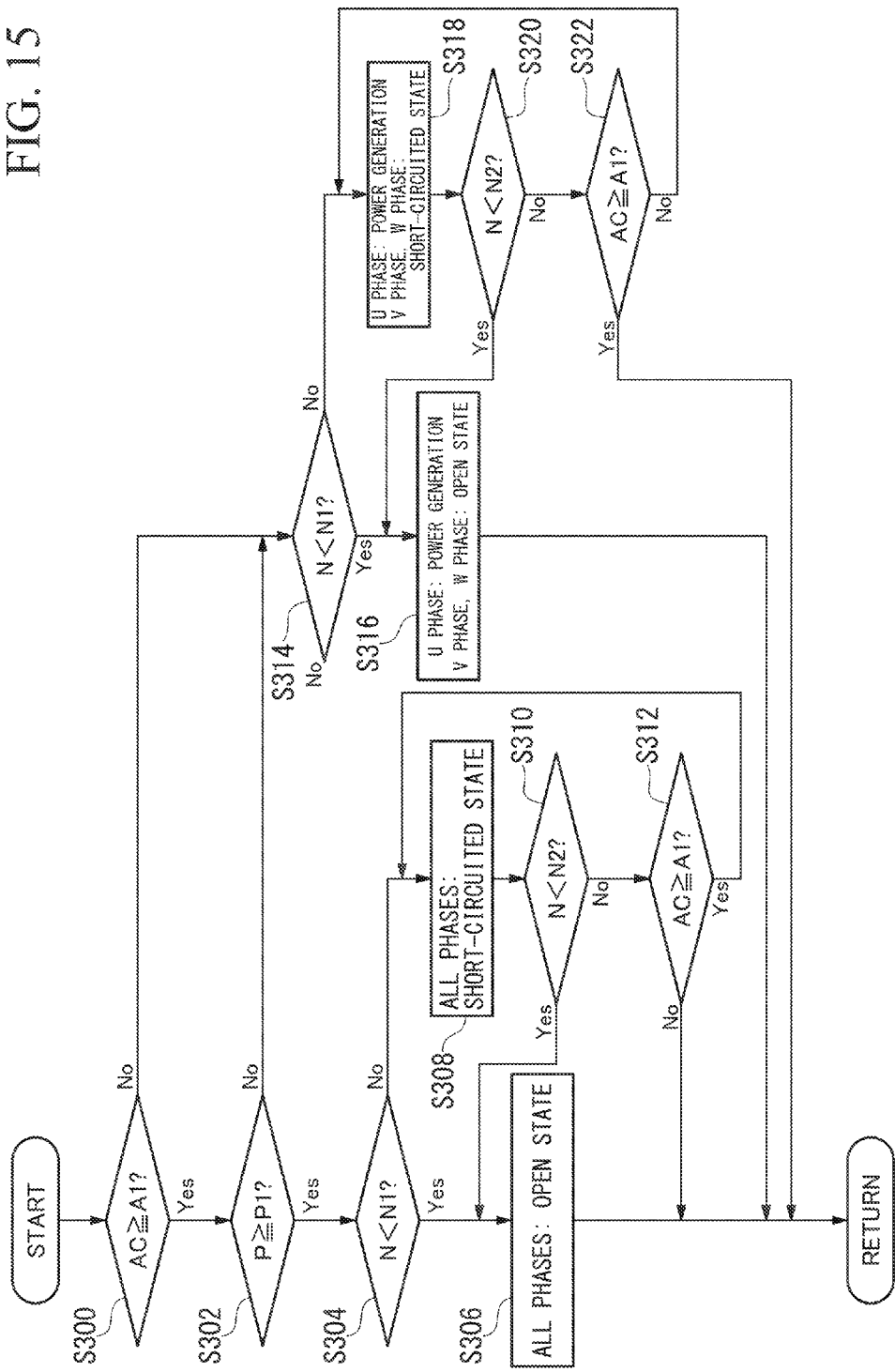
FIG. 15 illustrates an example of a flowchart illustrating a flow of processing executed by a controller of a third embodiment.

The controller 70 related to the third embodiment dynamically changes the control at the time of the regenerative control, on the basis of the information showing the acceleration instruction given to the motorcycle 1, such as the accelerator opening degree AC input from the accelerator opening sensor 76, and the charging rate (refer to the second embodiment) of the battery 80. FIG. 15 illustrates an example of a flowchart illustrating a flow of processing executed by the controller 70 of the third embodiment. The processing of the flowchart of FIG. 15 is repeatedly executed until the engine 10 stops after being started.

First, the controller 70 determines whether or not the accelerator opening degree AC input from the accelerator opening sensor 76 is equal to or greater than a threshold A1 (for example, about 50[%]) (Step S300). In addition, information, such as vehicle speed or acceleration, in addition to the accelerator opening, may be considered in this determination.

When the accelerator opening degree AC input from the accelerator opening sensor 76 is equal to or greater than the threshold A1 in Step S300, the controller 70 determines whether or not the charging rate P showing the charge state of the battery 80 is equal to or greater than the threshold (predetermined level) P1 (for example, about 50[%]) (Step S302).

When the charging rate P of the battery 80 is equal to or greater than the threshold P1 in Step S302, the controller 70 determines whether or not the number of rotations N of the rotor 61 is lower than the first threshold N1 (Step S304). When the number of rotations N of the rotor 61 is lower than the first threshold N1 in Step S304, the controller 70 brings the coils of all the phases into the open state (Step S306), and ends one routine in the processing of the flowchart of FIG. 15.

On the other hand, when the number of rotations N of the rotor 61 is equal to or greater than the first threshold N1 in Step S304, the controller 70 brings the coils of all the phases into the short-circuited state (Step S308). Then, the controller 70 maintains the V-phase and W-phase coils in the short-circuited state until the number of rotations N of the rotor 61 becomes lower than the second threshold N2 (Step S310). However, the controller 70 ends one routine in the processing of the flowchart of FIG. 15 if the accelerator opening degree AC becomes lower than the threshold A1 (Step S312).

For example, a relationship of N1>N2 is established between the first threshold N1 and the second threshold N2. Accordingly, the hunting can be prevented from occurring. Additionally, when the number of rotations N of the rotor 61 is lower than the second threshold N2 in Step S310, the controller 70 brings the coils of all the phases into the open state (Step S306), and ends one routine in the processing of the flowchart of FIG. 15.

Next, when the accelerator opening degree AC input from the accelerator opening sensor 76 is lower than the threshold A1 in Step S300, or when the charging rate P of the battery 80 is lower than the threshold P1 in Step S302, the controller 70 determines whether or not the number of rotations N of the rotor 61 is lower than the first threshold N1 (Step S314).

When the number of rotations N of the rotor 61 is lower than the first threshold N1 in Step S314, the controller 70 makes the U-phase coil operate as a phase regulator and brings the V-phase and W-phase coils into the open state (Step S316), and ends one routine in the processing of the flowchart of FIG. 15.

On the other hand, when the number of rotations N of the rotor 61 is equal to or greater than the first threshold N1 in Step S314, the controller 70 makes the U-phase coil operate as a phase regulator and brings the V-phase and W-phase coils into the short-circuited state (Step S318).

Then, the controller 70 maintains the V-phase and W-phase coils in the short-circuited state until the number of rotations N of the rotor 61 becomes lower than the second threshold N2 (Step S320). However, the controller 70 ends one routine in the processing of the flowchart of FIG. 15 if the accelerator opening degree AC becomes equal to or greater than the threshold A1 (Step S322).

For example, a relationship of N1>N2 is established between the first threshold N1 and the second threshold N2. Accordingly, the hunting can be prevented from occurring.

On the other hand, if the number of rotations N of the rotor 61 becomes lower than the second threshold N2 in Step S320, the controller 70 makes the U-phase coil operate as a phase regulator and brings the V-phase and W-phase coils into the open state (Step S316), and ends one routine in the processing of the flowchart of FIG. 15.

That is, when an acceleration instruction is given to the vehicle and the charge state of the vehicle-mounted battery 80 is equal to or greater than the predetermined level, the controller 70 (driving control part) brings all coils of a plurality of phases into the open state or the short-circuited state, and when the charge state of the battery 80 is lower than the predetermined level, the controller 70 makes some coils among of the plurality of phases generate electric power using the rotary power of the engine 10 (internal combustion engine), charges the battery 80 with this generated electric power, and brings some other coils among of the plurality of phases into the open state or the short-circuited state.

By virtue of such control, the power generation unit related to the third embodiment brings the coils of all the phases into the open state or the short-circuited state if there is an excessive charging amount regarding the charging rate of the battery 80 when an acceleration instruction given to the motorcycle 1 is made by a driver. Therefore, the friction can be further reduced and the acceleration ability of the motorcycle 1 can be improved.

According to the power generation unit and the motor generator control method related to the third embodiment described above, the same effects as those of the first embodiment can be exhibited, and also the friction can be further reduced and the acceleration ability of the motorcycle 1 can be improved.

In addition, the power generation unit related to the third embodiment may be operated in conjunction with the processing described in the second embodiment. That is, (1) when the accelerator opening degree AC is equal to or greater than the threshold and the charging rate P of the battery 80 is equal to or greater than the threshold P1, the controller 70 brings the coils of all the phases into the open state or the short-circuited state, and (2) when the accelerator opening degree AC is lower than the threshold and the charging rate P of the battery 80 is equal to or greater than the threshold P1, the controller 70 makes only the U-phase coil operate as a phase regulator, and (3) when the charging rate P of the battery 80 is lower than the threshold P1 irrespective of the accelerator opening degree AC, the controller 70 makes coils of two or more phases operate as phase regulators.

Fourth Embodiment

Hereinafter, a power generation unit and a motor generator control method related to a fourth embodiment of the invention will be described. Since the overall configuration of the motorcycle and the structure and the powering control of the power generation unit are the same as those of the first embodiment, FIGS. 1 to 3 and 5 to 7 will be referred to and repeated description thereof will be omitted.

Figure 16:
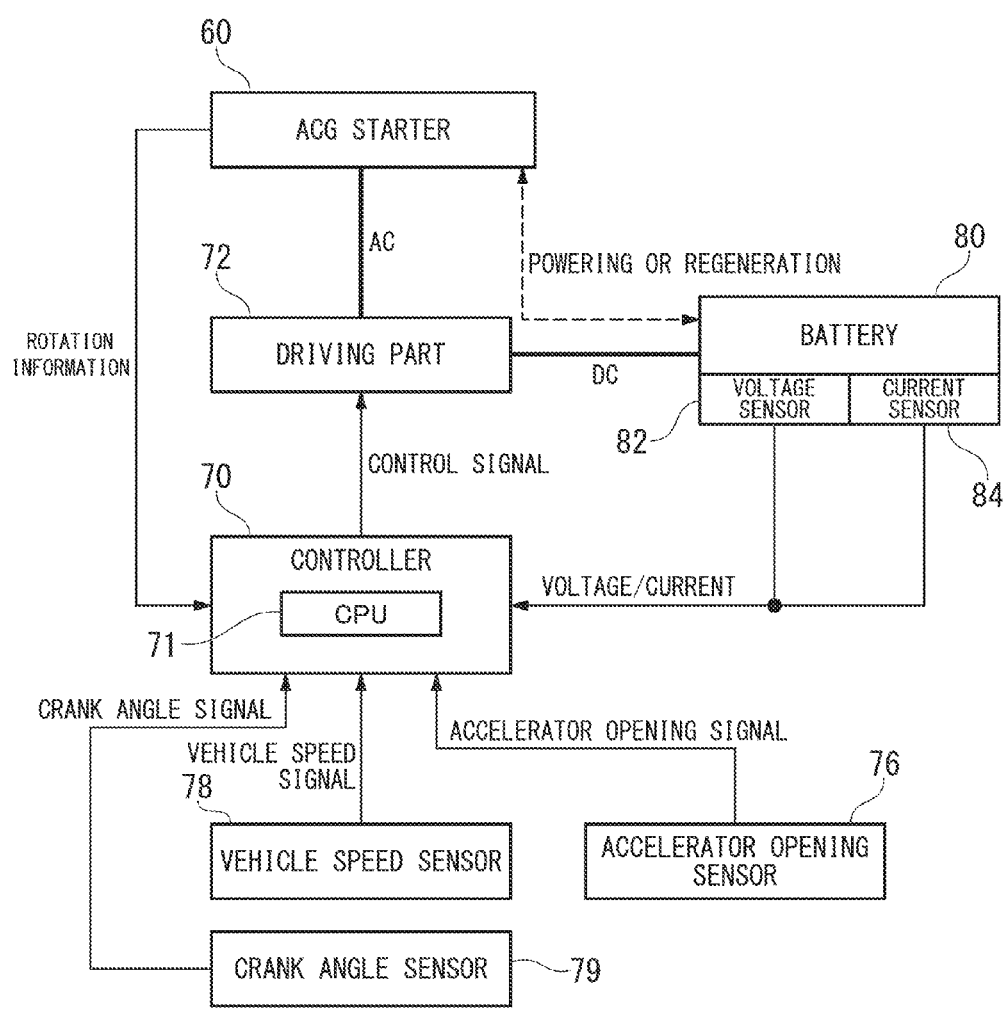
FIG. 16 is a view illustrating an example of a control-related configuration of an ACG starter of a fourth embodiment.

FIG. 16 is a view illustrating an example of a control-related configuration of the ACG starter 60 of the fourth embodiment. In the fourth embodiment, the accelerator opening signal showing the accelerator opening degree AC is input from the accelerator opening sensor 76 to the controller 70. Additionally, a speed signal showing a vehicle speed V is input from the vehicle speed sensor 78 to the controller 70. Additionally, a crank angle signal showing a crank angle θ is input from a crank angle sensor 79 to the controller 70.

The vehicle speed sensor 78 is attached to a wheel, the transmission 11, the crankshaft 16, and the like, and detects the speed of the motorcycle. The crank angle sensor 79 detects the rotational angle of the crankshaft 16.

Figure 17:
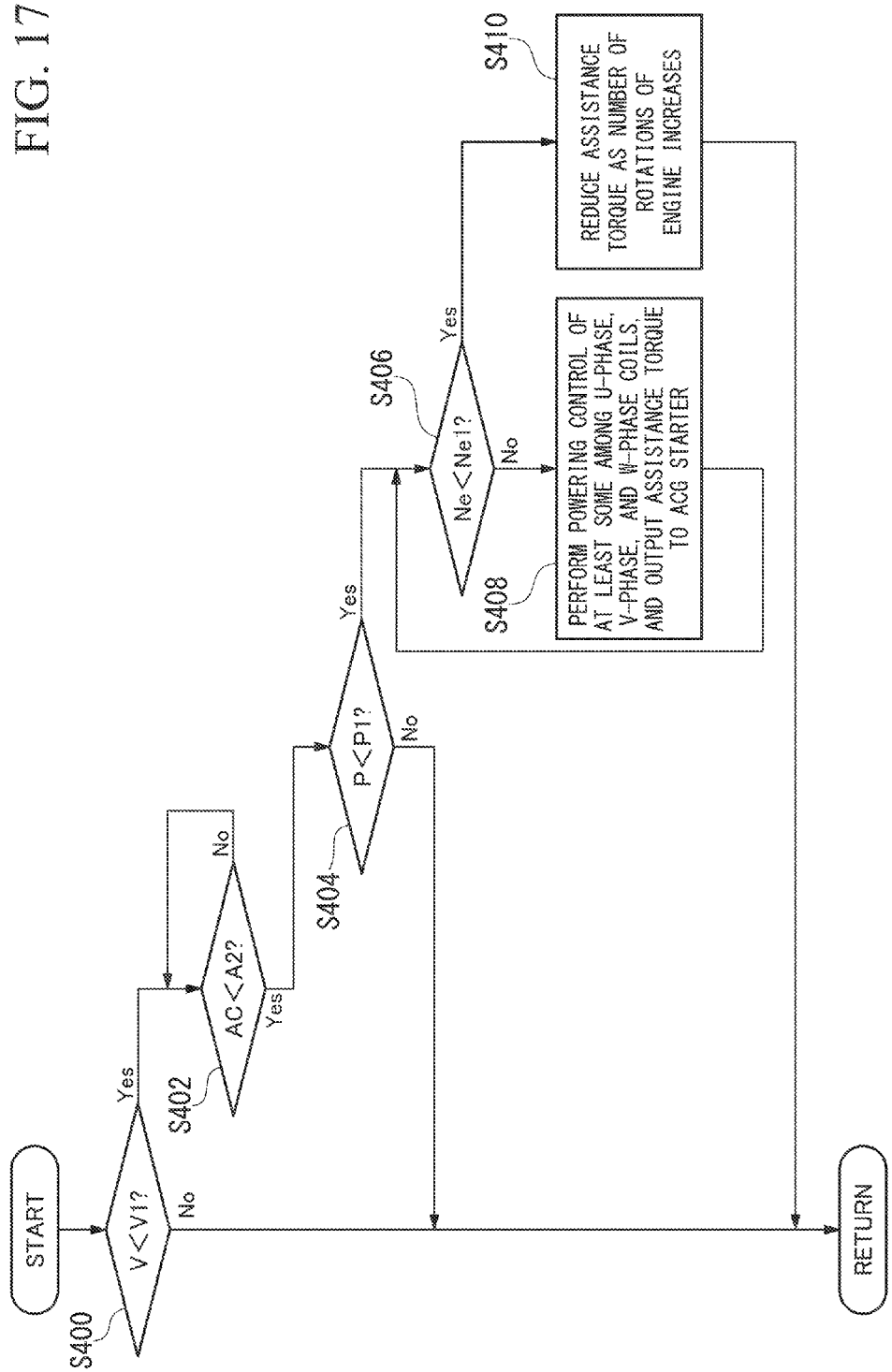
FIG. 17 illustrates an example of a flowchart illustrating a flow of processing executed by a controller of a fourth embodiment.

The controller 70 related to the fourth embodiment performs acceleration assistant control at the time of starting moving, on the basis of the accelerator opening degree AC input from the accelerator opening sensor 76 and the vehicle speed V input from the vehicle speed sensor 78. FIG. 17 illustrates an example of the flowchart illustrating the flow of the processing executed by the controller 70 of a fourth embodiment. The processing of the flowchart of FIG. 17 is repeatedly executed until the engine 10 stops after being started.

First, the controller 70 determines whether or not the vehicle speed V input from the vehicle speed sensor 78 is lower than the threshold V1 (a positive value near zero), that is, whether or not the motorcycle 1 is in a stopped state (Step S400). When the vehicle speed V is equal to or greater than the threshold V1, the controller 70 ends one routine in the processing of the flowchart of FIG. 17. In addition, instead of the determination of Step S400, it may be determined whether or not the number of rotations N of the rotor 61 is lower than the threshold N3 (a positive value near zero). In this case, the vehicle speed sensor 78 is not an indispensable component.

Next, when the vehicle speed V is lower than the threshold V1 in Step 400, the controller 70 stands by until the accelerator opening degree AC becomes equal to or greater than the threshold A2 (for example, about 5 [%]) (a start acceleration instruction is given by a driver) (Step S402). If the accelerator opening degree AC becomes equal to or greater than the threshold A2, the controller 70 determines whether or not the charging rate P of the battery 80 is equal to or greater than the threshold P1 (for example, about 50[%]) (Step S404). When the charging rate P of the battery 80 is lower than the threshold P1 in Step S404, the controller 70 ends one routine in the processing of the flowchart of FIG. 17. In addition, the determination of Step S404 may be omitted, and if the accelerator opening degree AC becomes equal to or greater than the threshold A2, the controller may proceed to Step S406.

On the other hand, when the charging rate P of the battery 80 is equal to or greater than the threshold P1 in Step S404, the controller 70 determines whether or not the number Ne of rotations of the engine 10 is equal to or greater than a threshold (predetermined number of rotations) Ne1 (Step S406). The number Ne of rotations of the engine 10 is calculated, for example, on the basis of the crank angle θ. Then, when the number Ne of rotations of the engine 10 is lower than the threshold Ne1 in Step S406, the controller 70 controls powering control of at least some of the U-phase, V-phase, and W-phase coils until the number Ne of rotations of the engine 10 becomes equal to or greater than the threshold Ne1, and makes the ACG starter 60 output an assistance torque (Step S408).

Here, the threshold Ne1 is the number of rotations of the engine 10 equivalent to the "predetermined speed" when the centrifugal clutch 8 outputs the rotational power of the crankshaft 16 to the outer clutch 25 when the rotating speed of the crankshaft 16 reaches the predetermined speed or higher. Determination regarding the number of rotations of the rotor 61 may be performed instead of the determination regarding the number of rotations of the engine 10.

Figure 18:
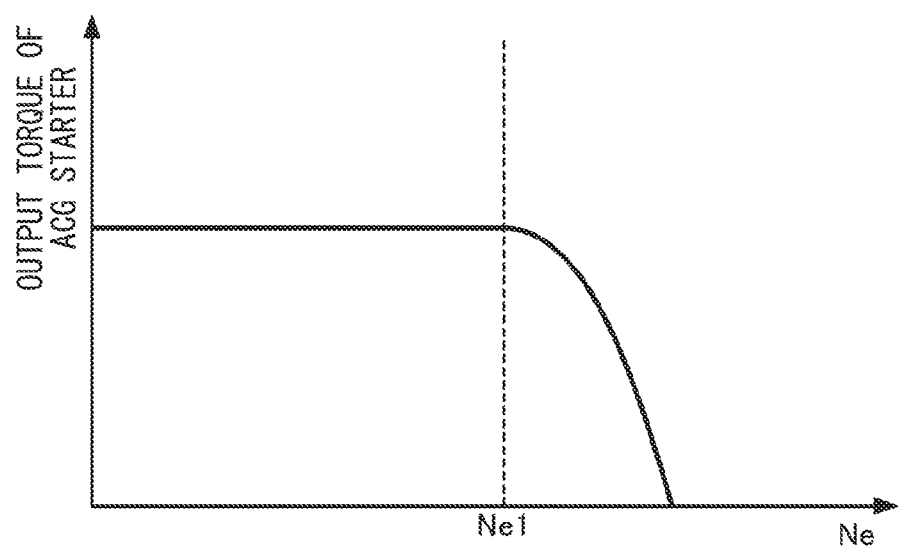
FIG. 18 is a view illustrating a relationship between changes in the number of rotations of the engine and an intensity of an assistance torque output from the ACG starter.

On the other hand, if the number Ne of rotations of the engine 10 becomes equal to or greater than the threshold Ne1 in Step S406, the controller 70 reduces the assistance torque as the number of rotations of the engine 10 increases (Step S408). FIG. 18 is a view illustrating the relationship between changes in the number Ne of rotations of the engine 10 and the intensity of the assistance torque output from the ACG starter 60.

That is, the controller 70 (driving control part) performs powering control of the ACG starter 60 (motor generator) by making at least some coils among of a plurality of phases into a first state in which torque is generated in the rotor 60, until the number of rotations of the engine 10 (internal combustion engine) becomes equal to or greater than the predetermined number of rotations after an acceleration instruction is given to the vehicle in the stopped state or in a state in which the vehicle travels at low speed.

By virtue of such control, the power generation unit related to the fourth embodiment performs powering control of a coil of at least one phase to output the assistance torque if there is an excessive charging amount regarding the charging rate of the battery 80 when a start instruction is given by a driver in the stopped state or in an extremely low-speed state, such as going slowly, of the motorcycle 1. Therefore, it is possible to shorten the time taken until the centrifugal clutch connects the crankshaft 18 and the outer clutch 25, and the acceleration ability at the time of starting moving in the motorcycle 1 can be improved.

According to the power generation unit and the motor generator control method related to the fourth embodiment described above, the same effects as those of the first embodiment can be exhibited, and also the acceleration ability at the time of starting moving in the motorcycle 1 can be improved.

Fifth Embodiment

Hereinafter, a power generation unit and a motor generator control method related to a fifth embodiment of the invention will be described. Since the overall configuration of the motorcycle and the structure and the powering control of the power generation unit are the same as those of the first embodiment, FIGS. 1 to 7 will be referred to and repeated description thereof will be omitted.

Figure 19:
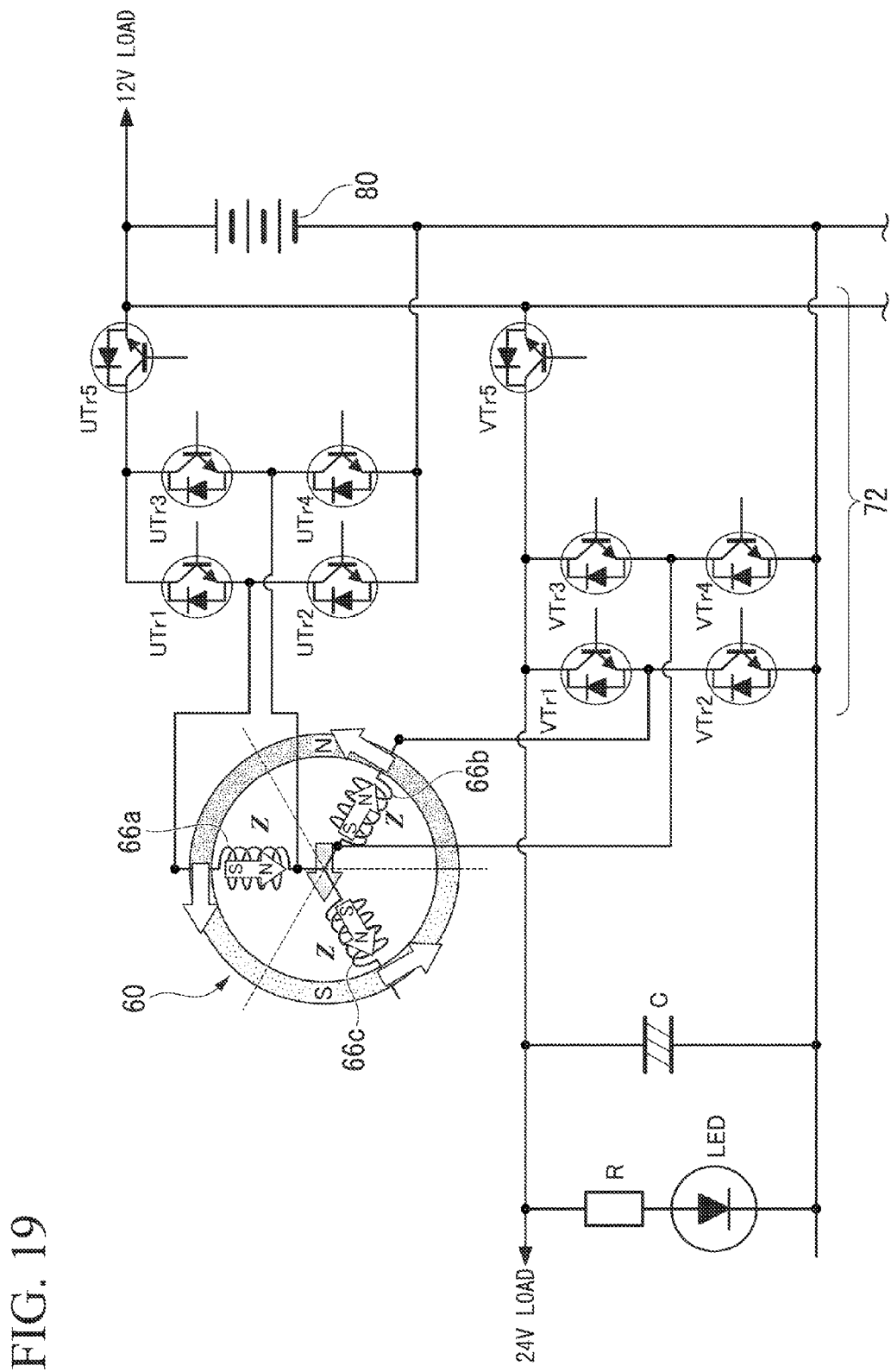
FIG. 19 is a view illustrating a wiring structure centered on an ACG starter of a power generation unit related to the fifth embodiment.

FIG. 19 is a view illustrating a wiring structure centered on the ACG starter 60 of the power generation unit related to the fifth embodiment. The power generation unit related to the fifth embodiment, for example, a voltage (for example, a voltage slightly higher than 12 V) for charging the battery 80 using the U-phase coil after the engine is started 10, generates a voltage (for example, 24 V) for driving a head lamp HL using the V-phase coil, and changes the W-phase coil into the open state or the short-circuited state as in the first embodiment. The V-phase coil can generate a voltage different from the U-phase coil, for example, by making the number of times wound or switching timing different from those of the U-phase coil. In addition, illustration of the W-phase switching elements is omitted in FIG. 19.

For example, a bypass capacitor C, a resistor R, and a light emitting diode (LED) that is a light emitter of the head lamp HL are connected between V-phase output terminals of the driving part related to the fifth embodiment.

In the related art, since the output voltage of the generator is of one type, it is necessary to supply a boosted voltage to instruments, which operate with a voltage higher than the supply voltage of the battery 80, using a boosting converter or the like. In contrast, the power generation unit of the fifth embodiment is equipped with coils of a plurality of phases that are not connected to each other. Therefore, a plurality of voltages can be generated without adding the boosting converter or the like. As a result, the cost and the weight of the device can be reduced.

According to the power generation unit and the motor generator control method of the fifth embodiment described above, the same effects as those of the first embodiment can be exhibited, and also a plurality of voltages can be generated without adding the boosting converter the like. As a result, the cost and the weight of the device can be reduced.

Although the modes for carrying out the invention have been described above using the embodiments, the invention is not limited to such embodiments, and various modifications and substitutions can be added without departing from the scope of the invention.

For example, in the above embodiments, the ACG starter 60 is controlled in three phases. However, the ACG starter may be controlled in two phases, four phases, five phases, six phases, or more.

Additionally, the power generation unit of the invention can be mounted on all types of vehicles, such as standard-sized automobiles and large-sized automobiles without being limited to the motorcycle. Additionally, the power generation unit of the invention can also be used for applications other than being mounted on vehicles.

In addition, the techniques of the above-described first embodiment to fifth embodiment can be suitably combined and used, respectively. Additionally, some constituent elements may be omitted.

REFERENCE SIGNS LIST

10: ENGINE (INTERNAL COMBUSTION ENGINE)
16: CRANKSHAFT (ROTATION OUTPUT SHAFT OF INTERNAL COMBUSTION ENGINE)
60: ACG STARTER (MOTOR GENERATOR)
61: ROTOR
62: MAGNET
65: STATOR
66: STATOR CORE
70: CONTROLLER
72: DRIVING PART
74: IGNITION SWITCH
76: ACCELERATOR OPENING SENSOR
80: BATTERY

The invention claimed is:

1. A power generation unit that is mounted on a vehicle together with an internal combustion engine that outputs a driving force for traveling and that has a rotor connected with a rotation output shaft of the internal combustion engine, the power generation unit comprising:
a motor generator having the rotor with a magnet, and a stator with coils driven in three or more phases, the coils of each phase not being connected to each other; and
a driving control part that performs control so that a coil of each phase of the stator is brought into any one of a first state in which torque is generated by the rotor, a second state in which both ends of the coil are disconnected from a vehicle-mounted battery, and a third state in which both ends of the coil are short-circuited,
wherein the driving control part performs powering control of the motor generator by making a second phase among the three or more phases into the first state when a number of rotations of the rotor is lower than a predetermined number of rotations, makes other coils into the second state or the third state, and reduces a torque applied to the rotation output shaft by the rotor as a number of rotations of the rotation output shaft of the internal combustion engine increases.

2. The power generation unit according to claim 1, wherein the driving control part brings some coils among the three or more phases into the second state or the third state when the motor generator is made to generate electric power using the output of the internal combustion engine.

3. The power generation unit according to claim 2, wherein the driving control part brings some coils among the three or more phases into the second state when the number of rotations of the rotor is lower than the predetermined number of rotations, and brings some coils among the three or more phases into the third state when the number of rotations of the rotor is equal to or greater than the predetermined number of rotations.

4. The power generation unit according to claim 2, wherein the driving control part brings all the coils of the three or more phases into the first state when the internal combustion engine is started by applying torque to the rotation output shaft.

5. The power generation unit according to claim 1, wherein the coils of the three or more phases have different numbers of turns, and generate electric power at mutually different power generation voltages.

6. The power generation unit according to claim 1, wherein the coils for the three or more phases have switching elements, and the driving control part makes switching timings for the switching elements of each phase different from each other, thereby making the coils of the three or more phases generate electric power at mutually different power generation voltages.

7. The power generation unit according to claim 5, wherein electric power generated by some coils among the three or more phases is used for charging the vehicle-mounted battery, and electric power generated by some other coils of the three or more phases is used for driving a lighting device.

8. The power generation unit according to claim 1, wherein when a charge state of the vehicle-mounted battery is equal to or greater than a predetermined level, the driving control part makes some coils among the three or more phases generate electric power using rotary power of the internal combustion engine, and charges the vehicle-mounted battery with the generated electric power, and brings some other coils among the three or more phases into the second state or the third state, and
wherein when the charge state of the vehicle-mounted battery is lower than the predetermined level, the driving control part makes the coils of phases, which has more phases than the phases of the some coils when the charge state of the vehicle-mounted battery is equal to or greater than the predetermined level, generate electric power using rotary power of the internal combustion engine.

9. The power generation unit according to claim 1, wherein when an acceleration instruction is given to the vehicle and when a charge state of the vehicle-mounted battery is equal to or greater than a predetermined level, the driving control part brings all the coils of the three or more phases into the second state or the third state, and
wherein when the acceleration instruction is given to the vehicle and when the charge state of the vehicle-mounted battery is lower than the predetermined level, the driving control part makes some coils among the three or more phases generate electric power using rotary power of the internal combustion engine, charges the vehicle-mounted battery with the generated electric power, and brings some other coils among the three or more phases into the second state or the third state.

10. The power generation unit according to claim 1, wherein the driving control part performs powering control of the motor generator while making at least some coils among the three or more phases in the first state until a number of rotations of the internal combustion engine becomes equal to or greater than a predetermined number of rotations after an acceleration instruction is given to the vehicle in a stopped state or in a state in which the vehicle travels at low speed.

11. The power generation unit according to claim 1, wherein the stator has coils driven in three phases, and wherein when electric power is generated using rotary power of a driving source, the driving control part brings a coil of one phase among the coils driven in the three phases into the first state and brings coils of the two remaining phases into the second state or the third state.

12. A method for controlling a motor generator that is mounted on a vehicle together with an internal combustion engine that outputs a driving force for traveling and that has a rotor connected with a rotation output shaft of the internal combustion engine, the motor generator having the rotor with a magnet, and a stator with coils driven in three or more phases, the coils of each phase not being connected to each other, wherein when a number of rotations of the rotor is in a low rotation range below a predetermined number of rotations, some coils among the three or more phases are brought into a state in which both ends are disconnected from a vehicle-mounted battery, wherein when the number of rotations of the rotor is in a high rotation range above the predetermined number of rotations, some coils among the three or more phases are brought into a state in which both ends of a coil are short-circuited, and wherein when the number of rotations of the rotor is lower than the predetermined number of rotations, making a second phase among the three or more phases into a state in which torque is generated by the rotor, and making the other coils into the state in which both ends are electrically disconnected from the vehicle-mounted battery or the state in which both ends of the coil are short-circuited, and reducing a torque applied to the rotation output shaft by the rotor as a number of rotations of the rotation output shaft of the internal combustion engine increases.

* * * * *